United States Patent
Wada et al.

[11] Patent Number: 6,007,201
[45] Date of Patent: Dec. 28, 1999

[54] MULTIFOCAL CONTACT LENS

[75] Inventors: Osamu Wada; Yoshinori Awanohara; Toshihide Shinohara; Akira Komatu; Osamu Yokoyama, all of Suwa, Japan

[73] Assignee: Seiko Epson Corporation, Tokyo-To, Japan

[21] Appl. No.: 08/945,073

[22] PCT Filed: Feb. 19, 1997

[86] PCT No.: PCT/JP97/00436

§ 371 Date: Jun. 4, 1998

§ 102(e) Date: Jun. 4, 1998

[87] PCT Pub. No.: WO97/31285

PCT Pub. Date: Aug. 28, 1997

[30] Foreign Application Priority Data

Feb. 21, 1996 [JP] Japan .................................. 8-034128

[51] Int. Cl.⁶ .................................................. G02C 7/04
[52] U.S. Cl. .......................................................... 351/161
[58] Field of Search .................... 351/159, 160 R, 351/161, 162, 168, 171, 177, 178; 451/42, 43

[56] References Cited

U.S. PATENT DOCUMENTS

| 4,704,016 | 11/1987 | De Carle | 351/161 |
| 5,541,678 | 7/1996 | Awanohara et al. | 351/177 |
| 5,619,289 | 4/1997 | Seidner et al. | 351/161 |

FOREIGN PATENT DOCUMENTS

| 56-144927 | 11/1981 | Japan . |
| 59-146020 | 8/1984 | Japan . |
| 07049471 | 2/1995 | Japan . |

*Primary Examiner*—George Manuel
*Attorney, Agent, or Firm*—Ladas & Parry

[57] ABSTRACT

There is provided a multifocal contact lens having a lens curve formed by alternately arranging a plurality of curved surfaces for far vision and a plurality of curved surfaces for near vision in the form of concentric zones, and a die for forming the contact lens, and a method for producing the contact lens. Each of the curved surfaces (F1, F2, ...) for far vision of the lens curve (2) has a center ($O_{F1}, O_{F2}, \ldots$) of curvature on an optical axis and a radius ($R_{F1}, R_{F2}, \ldots$) of curvature, which is set so that a ray being incident on the corresponding curved surface and being parallel to the optical axis forms an image at a location near a single focal point ($F_F$) for far vision on the optical axis, and each of the curved surfaces (N1, N2, ...) for near vision of the lens curve (2) has a center ($O_{N1}, O_{N2}, \ldots$) of curvature on the optical axis and a radius ($R_{N1}, R_{N2}, \ldots$) of curvature, which is set so that a ray being incident on the corresponding curved surface and being parallel to the optical axis forms an image at a location near a single focal point ($F_N$) for near vision on the optical axis.

27 Claims, 16 Drawing Sheets

MULTIFOCAL CONTACT LENS

BACKGROUND OF THE INVENTION

1. Field of The Invention

The present invention relates generally to a multifocal contact lens, a mold for forming the same, and a method for producing the same. More specifically, the invention relates to a multifocal contact lens with a lens curve formed by alternately arranging a plurality of curved surfaces for far vision and a plurality of curved surface for near vision in the form of concentric zones, a die for forming the same, a method for manufacturing the die, and a method for producing the multifocal contact lens.

2. Description of The Prior Art

A multifocal contact lens, wherein a plurality of portions for far vision and a plurality of portions for near vision are alternately arranged in the form of concentric zones, has been proposed in, e.g., Japanese Patent Laid-Open No. 59-146020. When a user wears such a contact lens, the user can consciously choose one of far and near ranges which can be simultaneously viewed by the user. This contact lens is useful since the user can naturally and smoothly choose one of the far and near ranges.

As shown in FIG. 8, such a contact lens 1 has a front curve 2 formed by alternately arranging a plurality of curved surfaces F1, F2, . . . for far vision and a plurality of curved surfaces N1, N2, . . . for near vision in the form of concentric zones, and a base curve 3 having a shape corresponding to the curved surface of the user's cornea.

In conventional contact lenses, the curved surfaces F1, F2, . . . for far vision and the curved surfaces N1, N2, . . . for near vision are formed on the front curve 2 as follows.

It is assumed that the radius of curvature of the curved surface for far vision is $R_F$ and the radius of curvature of the curved surface for near vision is $R_N$. First, a circle having a radius $R_F$ from a point P on an optical axis corresponding to Z-axis is described to derive an intersection point with the optical axis. It is assumed that this intersection point is a center $O_{F1}$ of curvature of the curved surface F1 for far vision. Then, a circle having the radius $R_F$ is described about the center $O_{F1}$ of curvature to derive an intersection point $P_{F1}$ with a straight line $l_{F1}$ which defines a predetermined zone width of the curved surface F1 for far vision and which is parallel to the optical axis. Then, a circle having the radius $R_N$ is described about the point $P_{F1}$ to derive an intersection point with the optical axis. In is assumed that this intersection point is a center $O_{N1}$ of curvature of the curved surface N1 for near vision. Then, a circle having the radius $R_N$ is described about the center $O_{N1}$ of curvature to derive an intersection point $P_{N1}$ with a straight line $l_{N1}$ defining a predetermined zone width of the curved surface N1 for near vision.

Similarly, a circle having the radius $R_F$ is described about the point $P_{N1}$ to derive an intersection point with the optical axis. It is assumed that this intersection point is a center $O_{F2}$ of curvature of the curved surface F2 for far vision. Then, a circle having the radius $R_F$ is described about the center $O_{F2}$ of curvature to derive an intersection point $P_{F2}$ with a straight line $l_{F2}$ which defines a predetermined zone width of the curved surface F2 for far vision and which is parallel to the optical axis. Then, a circle having the radius $R_N$ is described about the point $P_{F2}$ to derive an intersection point with the optical axis. It is assumed that this intersection point is a center $O_{N2}$ of curvature of the curved surface N2 for near vision.

The centers $O_{F1}$, $O_{F2}$, . . . of curvature of the curved surfaces F1, F2, . . . for far vision and the centers $O_{N1}$, $O_{N2}$, . . . of curvature of the curved surfaces N1, N2, . . . for near vision thus obtained are shown in FIG. 7.

As can be clearly seen from FIG. 7, the centers $O_{F1}$, $O_{F2}$, . . . of curvature of the curved surfaces F1, F2, . . . for far vision are distributed so as to be sequentially shifted in a direction of Z-axis, i.e., from the base curve 3 toward the front curve 2.

As a result, as shown in FIG. 6, rays, which are incident on the curved surfaces F1, F2, . . . for far vision and which are parallel to the optical axis, form images at the respective focal points $F_{F1}$, $F_{F2}$, . . . of the curved surfaces F1, F2, . . . for far vision, so that the image formation is not carried out at a point. Similarly, rays, which are parallel to rays being incident on the curved surfaces N1, N2, . . . for near vision, form images at the respective focal points $F_{N1}$, $F_{N2}$, . . . of the curved surfaces N1, N2, . . . for near vision, so that the image formation is not carried out at a point. That is, there is a problem in that the spherical aberration of the conventional contact lens is too great to obtain a clear image.

Furthermore, as shown in FIG. 6, since the spherical aberration of the periphery of the contact lens 1 is great, the order of arrangement of the focal points $F_{F1}$, $F_{F2}$, . . . for far vision is the reverse of the order of arrangement of the centers $O_{F1}$, $O_{F2}$, . . . of curvature of the curved surfaces F1, F2, . . . for far vision.

In order to eliminate such a problem, a multifocal contact lens has been proposed by the applicant of the instant application as shown in FIG. 5 (e.g., Japanese Patent Application No. 5-508019 (International Publication No. 93/14434)).

As shown in FIG. 5, a contact lens 1 has a front curve 2 formed by alternately arranging curved surfaces F1, F2, . . . for far vision and curved surfaces N1, N2, . . . for near vision in the form of concentric zones, and a base curve 3. It is assumed herein that the optical axis of the contact lens 1 is Z-axis and the direction of the Z-axis is from the front curve 2 toward the base curve 3. It is also assumed that X-axis passes through the vertex P of the contact lens 1 and is perpendicular to the Z-axis.

The shape of the curved surface of the base curve 3 is chosen so as to correspond to the shape of the curved surface of the user's cornea. On the basis of the values for the chosen shape of the curved surface of the base curve 3, the radius $R_F$ of curvature of the curved surfaces F1, F2, . . . for far vision and the radius $R_N$ of curvature of the curved surfaces N1, N2, . . . for near vision, which are required to obtain desired powers of the portions for far vision and desired added powers of the portions for near vision, are defined.

The centers $O_{F1, OF2}$, . . . and $O_{N1}$, $O_{N2}$, . . . of curvature of the curved surfaces F1, F2, . . . for far vision of the front curve 2 and the curved surface N1, N2, . . . for near vision of the front curve 2 are derived as follows.

As shown in FIG. 4, an intersection point of parallel rays being incident on the curved surface F1 for far vision and outgoing the base curve 3, with the optical axis is derived, and this intersection point is defined as a focal point $F_F$ for far vision. In addition, an intersection point of parallel rays being incident on the curved surface N1 for near vision and outgoing the base curve 3, with the optical axis is derived, and this intersection point is defined as a focal point $F_N$ for near vision.

First, it is assumed that the position on the optic axis, which is apart from the vertex P by the radius $R_F$ of curvature of the portion for far vision, is the center $O_{F1}$ of curvature of the curved surface F1 for far vision. Then, a circle having the radius $R_F$ is described about the center $O_{F1}$ of curvature to derive an intersection point $P_{F1}$ with a straight line $l_{F1}$, which defines a predetermined zone width of the curved surface F1 for far vision and which is parallel to the optical axis. Then, a circle having the radius $R_N$ is described about the point $P_{F1}$ to derive an intersectional point with the optical axis. It is assumed that this intersectional axis is the center $O_{N1}$ of curvature of the curved surface N1 for near vision. These steps are the same as those of the conventional method shown in FIG. 8.

Then, as shown in FIG. 5, the center $O_{F2}$ of curvature of the curved surface F2 for far vision is derived as follows. That is, a circle having the radius $R_N$ is described about the center $O_{N1}$ of curvature to derive an intersection point $P_{N1}$ with a straight line $l_{N1}$, which defines a predetermined zone width of the curved surface N1 for near vision and which is parallel to the optical axis. Then, a circle having the radius $R_F$ is described about the point $P_{N1}$ to derive an intersection point with the optical axis. This intersection point is defined as a proposed point for the point $O_{F2}$ which is to be the center of curvature of the curved surface F2 for far vision.

Then, the proposed point for the center $O_{F2}$ of curvature is used as a start point to derive a rightful center $O_{F2}$ of curvature near the proposed point using the ray tracing method. Specifically, the center $O_{F2}$ of curvature is derived using the ray tracing method as follows.

First, a circle having the radius $R_F$ is described about the proposed point for the center $O_{F2}$ of curvature to derive an intersection point of this circle with a straight line $l_{F2}$. It is assumed that this intersection point is a proposed point for the point $P_{F2}$ and that the curved surface extending from the point $P_{N1}$ to the point $P_{F2}$ is a proposed curved surface for the curved surface F2 for far vision.

Then, parallel rays are incident on the proposed curved surface for the curved surface F2 for far vision in the zone between the straight lines $l_{N1}$ and $l_{F2}$ to derive an intersection of the parallel rays outgoing the base curve 3 with the optical axis.

In a case where the intersection of the incident parallel rays with the optical axis is shifted from the focal point $F_F$ for far vision defined in FIG. 4 in a negative direction of Z-axis, the proposed curved surface for the curved surface F2 for far vision is rotated slightly counterclockwise about the point $P_{N1}$ in FIG. 5.

On the other hand, in a case where the intersection of the incident parallel rays with the optical axis is shifted from the focal point $F_F$ for far vision in a positive direction of Z-axis, the proposed curved surface for the curved surface F2 for far vision is rotated clockwise about the point $P_{N1}$.

Thus, the rotating direction and amount of the proposed curved surface for the curved surface F2 for far vision rotated about the point $P_{N1}$ are derived and the rotating position is decided so that the parallel rays being incident on the front curve 2 pass through the focal point $F_F$ for far vision. The curved surface, which is obtained by rotating the proposed curved surface for the curved surface F2 for far vision about the point $P_{N1}$ to the decided rotating position, is a curved surface F2 for far vision to be derived, and the decided center of curvature of the curved surface F2 for far vision is a center $O_{F2}$ of curvature to be derived.

Then, a center $O_{N2}$ of curvature of the curved surface N2 for near vision is derived as follows. That is, a circle having the radius $R_F$ is described about the decided center $O_{F2}$ of curvature to derive an intersection point with a straight line $l_{F2}$, which defines a predetermined zone width of the curved surface F2 for far vision and which is parallel to the optical axis, and this intersection point is defined as a point $P_{F2}$. Then, a circle having the radius $R_N$ is described about the point $P_{F2}$ to derive an intersection point with the optical axis, and this intersection point is assumed as a proposed point for the center $O_{N2}$ of curvature of the curved surface N2 for near vision.

Then, the proposed point for the center $O_{N2}$ of curvature is used as a start point to derive a rightful center $O_{N2}$ of curvature near the proposed point using the ray tracing method. In order to derive the rightful center $O_{N2}$, a circle having the radius $R_N$ is described about the proposed point for the center $O_{N2}$ of curvature to derive an intersection point of this circle with the straight line $l_{N2}$. This intersection point $P_{N2}$ is used as a proposed point to define the shape of a proposed curved surface for the curved surface N2 for near vision extending from the point $P_{F2}$ to the point $P_{N2}$.

Then, parallel rays in the range between the straight lines $l_{F2}$ and $l_{N2}$ are incident on the proposed curved surface for the curved surface for near vision to derive intersections of the parallel rays with the optical axis after outgoing the base curve 3.

In a case where the intersections of the incident parallel rays with the optical axis are shifted from the focal point $F_N$ for near vision shown in FIG. 4 in a negative direction of Z-axis, the proposed curved surface for the curved surface N2 for near vision is rotated slightly counterclockwise about the point $P_{F2}$ in FIG. 5.

On the other hand, in a case where the intersections of the incident parallel rays with the optical axis are shifted from the focal point $F_N$ for near vision in a positive direction of Z-axis, the proposed curved surface for the curved surface N2 for near vision is rotated clockwise about the point $P_{F2}$.

Thus, the direction and amount of the proposed curved surface for the curved surface N2 for near vision rotating about the point $P_{F2}$ is derived so that the parallel rays being incident on the front curve 2 pass through the focal point $F_N$ for near vision, and the rotating position is decided. The curved surface, which is obtained by rotating the proposed curved surface for the curved surface N2 for near vision about the point $P_{F2}$ to the decided rotating position, is a curved surface N2 for near vision to be derived, and the center of curvature of the decided curved surface N2 for near vision is a center $O_{N2}$ of curvature to be derived.

Similarly, other centers $O_{F3}$, $O_{F4}$, . . . and $O_{N3}$, $O_{N4}$, . . . of curvature are derived, so that the contact lens 1 shown in FIG. 5 is obtained.

However, in the case of the contact lens shown in FIG. 5, the spherical aberration may be sufficiently corrected for the following reasons.

That is, as shown in FIG. 5, although the center $O_{F1}$ of curvature of the curved surface F1 for far vision and the center $O_{N1}$ of curvature of the curved surface N1 for near vision are located on the optical axis, the centers $O_{F2}$, $O_{F3}$, . . . of curvature of the curved surfaces F2, F3, . . . for far vision and the centers $O_{N2}$, $O_{N3}$, . . . of curvature of the curved surface N2, N3, . . . for near vision are not located on the optical axis to be apart from the optical axis in a direction of X-axis. In addition, the ray tracing method is applied under the restriction that the curved surfaces F1, F2, F3, . . . for far vision must have the same radius $R_N$ of curvature and the curved surface N1, N2, N3, . . . for near vision must have the same radius $R_N$ of curvature When the ray tracing method is applied, the degree of freedom of design is decreased, so that the spherical aberration may remain as follows.

For example, with respect to the whole predetermined zone widths of the curved surface F2 for far vision and the curved surface N2 for near vision, there is considered parallel rays being incident in parallel to the optical axis and outgoing the base curve 3 to travel to the intersection with the optical axis. As shown in FIG. 4, these parallel rays converge before the optical axis after outgoing the base curve 3, and then, they are divergent rays. Therefore, no image is formed at a point on the optical axis defined by the line extending from the vertex P of the contact lens to the center $O_{F1}$ of curvature of the curved surface F1 for far vision, so that spherical aberrations remain in the respective spherical surfaces of the curved surface F2 for far vision and the curved surface N2 for near vision.

More specifically, the parallel rays being incident on the curved surface F2 for far vision at a predetermined zone width, outgo the base curve 3 to converge at the respective points on a ring, which is described about the Z-axis so as to have a radius corresponding to the distance between the Z-axis and the point $O_{F2}$. Thereafter, the rays become divergent rays, so that an image is formed on the Z-axis in the form of a line, not a point. In addition, the parallel rays being incident on the curved surface N2 for near vision at a predetermined zone width, outgo the base curve 3 to converge at the respective points on a ring, which is described about the Z-axis so as to have a radius corresponding to the distance between the Z-axis and the point $O_{N2}$. Thereafter, the rays become divergent rays, so that an image is formed on the Z-axis in the form of a line, not a point. Thus, the parallel rays being incident on the respective curved surface do not form images at the focal point $F_F$ for far vision and the focal point $F_N$ for near vision on the curved surface defined above, so that spherical aberrations remain in the respective curved surfaces. This is the same with respect to the curved surfaces F2, F3, . . . for far vision and the curved surfaces N2, N3, . . . for near vision determined by the ray tracing method.

In addition, the dimension of the spherical aberration is under the influence of the absolute quantity of variation of the respective centers $O_{F2}$, $O_{F3}$, . . . and $O_{N2}$, $O_{N3}$, . . . of curvature in a direction of X-axis when the shapes of the curved surfaces F2, F3, . . . for far vision and the curved surfaces N2, N3, . . . for near vision are determined by the ray tracing method.

More specifically, when the shapes of the curved surfaces F2, F3, . . . for far vision and the curved surfaces N2, N3, . . . for near vision are decided by the ray tracing method, as the distances between the respective centers $O_{F2}$, $O_{F3}$, . . . and $O_{N2}$, $O_{N3}$, . . . of curvature and the optical axis in a direction of the X-axis is increased, the spherical aberration is increased.

Thus, in the case of the contact lens shown in FIG. 5, although the center $O_{F1}$ of curvature and the center $O_{N1}$ of curvature are located on the optical axis, the centers $O_{F2}$, $O_{F3}$, . . . of curvature of the other curved surfaces F2, F3, . . . for far vision and the centers $O_{N2}$, $O_{N3}$, . . . of curvature of the other curved surfaces N2, N3, . . . for near vision are not located on the optical axis. In addition, the ray tracing method is applied under the restriction that the curved surfaces F1, F2, F3, . . . for far vision have the same radius $R_F$ of curvature and the curved surfaces N1, N2, N3, . . . for near vision have the same radius $R_N$ of curvature. Therefore, there are problems in that the degree of freedom of design is not sufficient and that spherical aberration may remain.

SUMMARY OF THE INVENTION

It is therefore an object of the present invention to eliminate the aforementioned problems and to provide a multifocal contact lens, which has a lens curve formed by alternately arranging a plurality of curved surfaces for far vision and near vision in concentric zones and which can suitably remove spherical aberrations to obtain a clear visual acuity, and a mold for forming the multifocal contact lens.

It is another object of the present invention to provide a multifocal contact lens, which can obtain substantially the same performance as that of a single focal lens by putting it to proper use in accordance with indoor and outdoor uses and which has a bifocal function for a longsighted and shortsighted person.

It is further object of the present invention to provide a method for producing a multifocal contact lens, by which the boundary between the adjacent curved surfaces for far vision and near vision of the lens can be uniformly polished.

In order to accomplish the aforementioned and other objects, according to one aspect of the present invention, there is provides a multifocal contact lens having a lens curve formed by alternately arranging a plurality of curved surfaces for far vision and a plurality of curved surfaces for near vision in the form of concentric zones, wherein each of the plurality of curved surfaces for far vision of the lens curve has a center of curvature on an optical axis and a radius of curvature, which is set so that a ray being incident on the corresponding curved surface and being parallel to the optical axis forms an image at a location near a single focal point for far vision on the optical axis, and wherein each of the plurality of curved surfaces for near vision of the lens curve has a center of curvature on the optical axis and a radius of curvature, which is set so that a ray being incident on the corresponding curved surface and being parallel to the optical axis forms an image at a location near a single focal point for near vision on the optical axis.

According to another aspect of the present invention, there is provided a multifocal contact lens having a lens curve formed by alternately arranging a plurality of curved surfaces for far vision and a plurality of curved surfaces for near vision in the form of concentric zones, wherein each of the plurality of curved surfaces for far vision of the lens curve has a center of curvature on an optical axis and a radius of curvature, which is set so that a predetermined principal ray being incident on the corresponding curved surface and being parallel to the optical axis passes through a location near a single focal point for far vision on the optical axis, and wherein each of the plurality of curved surfaces for near vision of the lens curve has a center of curvature on the optical axis and a radius of curvature, which is set so that a predetermined principal ray being incident on the corresponding curved surface and being parallel to the optical axis passes through a location near a single focal point for near vision on the optical axis.

As the predetermined principal ray, a ray passing through a predetermined location in a zone width of each of the curved surfaces for far vision and near vision may be selected with respect to all the curved surfaces for far vision and near vision, which include the curved surface for far vision containing the optical axis and the curved surface for near vision containing the optical axis. The predetermined location in the zone width of each of all the curved surfaces may be the center in the zone width of each of all the curved surfaces. Alternatively, as the predetermined principal ray, a ray, which corresponds to the optical axis with respect to a curved surface for far vision containing the optical axis and a curved surface for near vision containing the optical axis and which passes through a predetermined location in a zone width of each of other curved surfaces for far vision and near vision may be selected with respect to the other curved surfaces for far vision and near vision. Each of the curved surfaces for far vision may have a radius of curvature which is different from those of other curved surfaces for far vision, and each of the curved surfaces for near vision may have a radius of curvature which is different from those of other curved surfaces for near vision. The lens curve may be a front curve. The zone width of each of the curved surfaces for far vision may vary in accordance with the distance between each of the curved surfaces for far vision and the optical axis, and the zone width of each of the curved surfaces for near vision may vary in accordance with the distance between each of the curved surfaces for near vision and the optical axis. Specifically, the zone width of each of the curved surfaces for far vision may increase in accordance with the distance between each of the curved surfaces for far vision and the optical axis, and the zone width of each of the curved surfaces for near vision may increase in accordance with the distance between each of the curved surfaces for near vision and the optical axis. Alternatively, the zone width of each of the curved surfaces for far vision may decrease in accordance with the distance between each of the curved surfaces for far vision and the optical axis, and the zone width of each of the curved surfaces for near vision may decrease in accordance with the distance between each of the curved surfaces for near vision and the optical axis. That is, the zone width of each of the curved surfaces for far vision may decrease or increase in accordance with the distance between each of the curved surfaces for far vision and the optical axis, and the zone width of each of the curved surfaces for near vision may decrease or increase in accordance with the distance between each of the curved surfaces for near vision and the optical axis. Alternatively, the zone width of each of the curved surfaces for far vision may be substantially the same as those of other curved surfaces for far vision, and the zone width of each of the curved surfaces for near vision may be substantially the same as those of other curved surfaces for near vision. In addition, an energy ratio of the curved surface for far vision to the curved surface for near vision may be set in accordance with indoor or outdoor use. The energy ratio may be an area ratio of the curved surface for far vision to the curved surface for near vision. Alternatively, the energy ratio may be a ratio of amount of transmitted light.

According to another aspect of the present invention, there is provided a mold for forming a multifocal contact lens having a lens curve formed by alternately arranging a plurality of curved surfaces for far vision and a plurality of curved surfaces for near vision in the form of concentric zones, wherein each of the plurality of curved surfaces for far vision of the lens curve has a center of curvature on an optical axis and a radius of curvature, which is set so that a ray being incident on the corresponding curved surface and being parallel to the optical axis forms an image at a location near a single focal point for far vision on the optical axis, and wherein each of the plurality of curved surfaces for near vision of the lens curve has a center of curvature on the optical axis and a radius of curvature, which is set so that a ray being incident on the corresponding curved surface and being parallel to the optical axis forms an image at a location near a single focal point for near vision on the optical axis.

According to another aspect of the present invention, there is provided a mold for forming a multifocal contact lens having a lens curve formed by alternately arranging a plurality of curved surfaces for far vision and a plurality of curved surfaces for near vision in the form of concentric zones, wherein each of the plurality of curved surfaces for far vision of the lens curve has a center of curvature on an optical axis and a radius of curvature, which is set so that a predetermined principal ray being incident on the corresponding curved surface and being parallel to the optical axis passes through a location near a single focal point for far vision on the optical axis, and wherein each of the plurality of curved surfaces for near vision of the lens curve has a center of curvature on the optical axis and a radius of curvature, which is set so that a predetermined principal ray being incident on the corresponding curved surface and being parallel to the optical axis passes through a location near a single focal point for near vision on the optical axis.

According to another aspect of the present invention, there is provided a method for producing a multifocal contact lens having a lens curve formed by alternately arranging a plurality of curved surfaces for far vision and a plurality of curved surfaces for near vision in the form of concentric zones, the method comprising the steps of: determining a focal point for far vision and a focal point for near vision on an optical axis; sequentially setting a proposal for a center of curvature and a proposal for a radius of curvature, which define each of the curved surfaces for far vision and near vision, with respect to each of the curved surfaces for far vision and near vision in the order of from the curved surface for far vision or near vision nearest the optical axis toward the curved surface for near vision or far vision apart from the optical axis; sequentially changing the proposal for the center of curvature and the proposal for the radius of curvature to carry out the ray tracing so that a predetermined principal ray being parallel to the optical axis passes through the focal point for far vision or the focal point for near vision; and deciding the center of curvature of each of the curved surfaces on the optical axis, and the radius of curvature of each of the curved surfaces.

The method for producing a multifocal contact lens may further comprise the steps of: defining a focal point for far vision and a focal point for near vision on an optical axis; setting a proposal for a center of curvature of a first portion for far vision and a proposal for a radius of curvature of the first portion for far vision, the center of curvature and the radius of curvature of the first portion for far vision defining a first curved surface for far vision containing the optical axis; deriving an intersection point of a circle, which is described about the proposal for the center of curvature of the first portion for far vision so as to have a radius being the same as the proposal for the radius of curvature of the first portion for far vision, with a straight line of the first portion for far vision, which is parallel to the optical axis defining a zone width of the first curved surface for far vision; sequentially changing the proposal for the center of curvature of the first portion for far vision and the proposal for the radius of curvature of the first portion for far vision to carry out the ray tracing so that a predetermined principal ray, which is incident on the proposal for the first curved surface for far vision and which is parallel to the optical axis, passes through the focal point for far vision, to decide the center of curvature of the first portion for far vision and the radius of curvature of the first portion for far vision; deriving an intersection point of a circle, which is described about the decided center of curvature of the first portion for far vision so as to have the radius of curvature of the first portion for far vision, with the straight line of the first portion for far vision as an intersection point of the first portion for far vision, and deciding a curved surface extending from a vertex of the lens curve to the intersection point of the first portion for far vision as the first curved surface for far vision; setting a proposal for a radius of curvature of a first portion for near vision defining a first curved surface for near vision outwards adjacent to the first curved surface for far vision, and deriving an intersection point of a circle, which is described about the intersection point of the first portion for far vision so as to have a radius being the same as the proposal for the radius of curvature of the first portion for far vision, with the optical axis as a proposal for a center of curvature of the first portion for near vision; deriving an intersection point of a circle, which is described about the proposal for the center of curvature of the first portion for near vision so as to have a radius being the same as the proposal for the radius of curvature of the first portion for near vision, with a straight line of the first portion for near vision, which defines a zone width of the first curved surface for near vision and which is parallel to the optical axis, to derive a proposal for the first curved surface for near vision; sequentially changing the proposal for the center of curvature of the first portion for near vision and the proposal for the radius of curvature of the first portion for near vision, to carry out the ray tracing so that a predetermined principal ray, which is incident on the proposal for the curved surface of the first portion for near vision and which is parallel to the optical axis, to decide the center of curvature of the first portion for near vision and the radius of curvature of the first portion for near vision; deriving an intersection point of a circle, which is described about the decided center of curvature of the first portion for near vision so as to have a radius being the same as the radius of curvature of the first portion for near vision, with the straight line of the first portion for near vision as an intersection point of the first portion for near vision, and deciding a curved surface extending from the intersection point of the first portion for far vision to the intersection point of the first portion for near vision as the first curved surface for near vision; setting a proposal for a radius of curvature of a second portion for far vision defining a curved surface of a second portion for far vision outsides adjacent to the first curved surface for near vision, and deriving an intersection point of a circle, which is described about the intersection point of the first portion for near vision so as to have a radius being the same as the proposal for the radius of curvature of the second portion for far vision, with the optical axis as a proposal for a center of curvature of the second portion for far vision; deriving an intersection point of a circle, which is described about the proposal for the center of curvature of the second portion for far vision so as to have a radius being the same as the proposal for the radius of curvature of the second portion for far vision, with a straight line of the second portion for far vision, which defines a zone width of the second curved surface for far vision and which is parallel to the optical axis; sequentially changing the proposal for the center of curvature of the second portion for far vision and the proposal for the radius of curvature of the second portion for far vision, to carry out the ray tracing so that a predetermined principal ray, which is incident on the proposal for the second curved surface for far vision and which is parallel to the optical axis, passes through the focal point for far vision, to decide the center of curvature of the second portion for far vision and the radius of curvature of the second portion for far vision; deriving an intersection point of a circle, which is described about the decided center of curvature of the second portion for far vision so as to have a radius being the same radius of curvature of the second portion for far vision, with the straight line of the second portion for far vision as an intersection portion of the second portion for far vision, and deciding a curved surface extending from the intersection point of the first portion for near vision to the intersection point of the second portion for far vision as the second curved surface for far vision; setting a proposal for a radius of curvature of a second portion for near vision defining a curved surface of a second portion for near vision outwards adjacent to the second curved surface for far vision, and deciding an intersection point of a circle, which is described about the intersection point of the second portion for far vision so as to have a radius being the same as the proposal for the radius of curvature of the second portion for near vision, with the optical axis as a proposal for a center of curvature of the second portion for near vision; deriving an intersection point of a circle, which is described about the proposal for the center of curvature of the second portion for near vision so as to have a radius being the same as the proposal for the radius of curvature of the second portion for near vision, with a straight line of a second portion for near vision, which defines a zone width of the second curved surface for near vision and which is parallel to the optical axis, to derive a proposal for the second curved surface for near vision; sequentially changing the proposal for the center of curvature of the second portion for near vision and the proposal for the radius of curvature of the second portion for near vision, to carry out the ray tracing so that a predetermined principal ray, which is incident on the proposal for the second curved surface for near vision and which is parallel to the optical axis, passes through the focal point for near vision, to decide the center of curvature of the second portion for near vision and the radius of curvature of the second portion for near vision; and deriving an intersection point of a circle, which is described about the decided center of curvature of the second portion for near vision so as to have a radius being the same as the radius of curvature of the second portion for near vision, with the straight line of the second portion for near vision as an intersection point of the second portion for near vision, and deciding a curved surface extending from the intersection point of the second portion for far vision to the intersection point of the second portion for near vision as the second curved surface for near vision.

Alternatively the method for producing a multifocal contact lens may further comprise the steps of: defining a focal point for far vision and a focal point for near vision on an optical axis; setting a proposal for a center of curvature of a first portion for near vision and a proposal for a radius of curvature of a first portion for near vision, the center of curvature and the radius of curvature of the first portion for near vision defining a first curved surface for near vision containing the optical axis; deriving an intersection point of a circle, which is described about the proposal for the center of curvature of the first portion for near vision so as to have a radius being the same as the proposal for the radius of curvature of the first portion for near vision, with a straight line of the first portion for near vision, which is parallel to the optical axis defining a zone width of the first curved surface for near vision; sequentially changing the proposal for the center of curvature of the first portion for near vision and the proposal for the radius of curvature of the first portion for near vision to carry out the ray tracing so that a predetermined principal ray, which is incident on the proposal for the first curved surface for near vision and which is parallel to the optical axis, passes through the focal point for near vision, to decide the center of curvature of the first portion for near vision and the radius of curvature of the first portion for near vision; deriving an intersection point of a circle, which is described about the decided center of curvature of the first portion for near vision so as to have the radius of curvature of the first portion for near vision, with the straight line of the first portion for near vision as an intersection point of the first portion for near vision, and deciding a curved surface extending a vertex of the lens curve to the intersection point of the first portion for near vision as the first curved surface for near vision; setting a proposal for a radius of curvature of a first portion for far vision defining a first curved surface for far vision outwards adjacent to the first curved surface for near vision, and deriving an intersection point of a circle, which is described about the intersection point of the first portion for near vision so as to have a radius being the same as the proposal for the radius of curvature of the first portion for near vision, with the optical axis as a proposal for a center of curvature of the first portion for far vision; deriving an intersection point of a circle, which is described about the proposal for the center of curvature of the first portion for far vision so as to have a radius being the same as the proposal for the radius of curvature of the first portion for far vision, with a straight line of the first portion for far vision, which defines a zone width of the first curved surface for far vision and which is parallel to the optical axis, to derive a proposal for the first curved surface for far vision; sequentially changing the proposal for the center of curvature of the first portion for far vision and the proposal for the radius of curvature of the first portion for far vision, to carry out the ray tracing so that a predetermined principal ray, which is incident on the proposal for the curved surface of the first portion for far vision and which is parallel to the optical axis, to decide the center of curvature of the first portion for far vision and the radius of curvature of the first portion for far vision; deriving an intersection point of a circle, which is described about the decided center of curvature of the first portion for far vision so as to have a radius being the same as the radius of curvature of the first portion for far vision, with the straight line of the first portion for far vision as an intersection point of the first portion for far vision, and deciding a curved surface extending from the intersection point of the first portion for near vision to the intersection point of the first portion for far vision as the first curved surface for far vision; setting a proposal for a radius of curvature of a second portion for near vision defining a curved surface of a second portion for near vision outsides adjacent to the first curved surface for far vision, and deriving an intersection point of a circle, which is described about the intersection point of the first portion for far vision so as to have a radius being the same as the proposal for the radius of curvature of the second portion for near vision, with the optical axis as a proposal for a center of curvature of the second portion for near vision; deriving an intersection point of a circle, which is described about the proposal for the center of curvature of the second portion for near vision so as to have a radius being the same as the proposal for the radius of curvature of the second portion for near vision, with a straight line of the second portion for near vision, which defines a zone width of the second curved surface for near vision and which is parallel to the optical axis; sequentially changing the proposal for the center of curvature of the second portion for near vision and the proposal for the radius of curvature of the second portion for near vision, to carry out the ray tracing so that a predetermined principal ray, which is incident on the proposal for the second curved surface for near vision and which is parallel to the optical axis, passes through the focal point for near vision, to decide the center of curvature of the second portion for near vision and the radius of curvature of the second portion for near vision; deriving an intersection point of a circle, which is described about the decided center of curvature of the second portion for near vision so as to have a radius being the same radius of curvature of the second portion for near vision, with the straight line of the second portion for near vision as an intersection portion of the second portion for near vision, and deciding a curved surface extending from the intersection point of the first portion for far vision to the intersection point of the second portion for near vision as the second curved surface for near vision; setting a proposal for a radius of curvature of a second portion for far vision defining a second curved surface for far vision outwards adjacent to the second curved surface for near vision, and deciding an intersection point of a circle, which is described about the intersection point of the second portion for near vision so as to have a radius being the same as the proposal for the radius of curvature of the second portion for far vision, with the optical axis as a proposal for a center of curvature of the second portion for far vision; deriving an intersection point of a circle, which is described about the proposal for the center of curvature of the second portion for far vision so as to have a radius being the same as the proposal for the radius of curvature of the second portion for far vision, with a straight line of the second portion for far vision, which defines a zone width of the second curved surface for far vision and which is parallel to the optical axis, to derive a proposal for the second curved surface for far vision; sequentially changing the proposal for the center of curvature of the second portion for far vision and the proposal for the radius of curvature of the second portion for far vision, to carry out the ray tracing so that a predetermined principal ray, which is incident on the proposal for the second curved surface for far vision and which is parallel to the optical axis, passes through the focal point for far vision, to decide the center of curvature of the second portion for far vision and the radius of curvature of the second portion for far vision; and deriving an intersection point of a circle, which is described about the decided center of curvature of the second portion for far vision so as to have a radius being the same as the radius of curvature of the second portion for far vision, with the straight line of the second portion for far vision as an intersection point of the second portion for far vision, and deciding a curved surface extending from the intersection point of the second portion for near vision to the intersection point of the second portion for far vision as the second curved surface for far vision.

In the aforementioned method for a multifocal contact lens, the predetermined principal ray may be a ray passing through a predetermined location in a zone width of each of the curved surfaces for far vision and near vision with respect to all the curved surfaces for far vision and near vision, which include the curved surface for far vision containing the optical axis and the curved surface for near vision containing the optical axis. The predetermined location in the zone width of each of all the curved surfaces may be the center in the zone width of each of all the curved surfaces. Alternatively, the predetermined principal ray may be a ray, which corresponds to the optical axis with respect to a curved surface for far vision containing the optical axis and a curved surface for near vision containing the optical axis and which passes through a predetermined location in a zone width of each of curved surfaces with respect to other curved surfaces for far vision and near vision. Each of the curved surfaces for far vision may have a radius of curvature which is different from those of other curved surfaces for far vision, and each of the curved surfaces for near vision may have a radius of curvature which is different from those of other curved surfaces for near vision. The lens curve may be a front curve.

According to further aspect of the present invention, there is provided a method for producing a multifocal contact lens having a lens curve formed by alternately arranging a plurality of curved surfaces for far vision and a plurality of curved surfaces for near vision in the form of concentric zones, wherein each of the plurality of curved surfaces for far vision of the lens curve has a center of curvature on an optical axis and a radius of curvature, which is set so that a ray being incident on the corresponding curved surface and being parallel to the optical axis forms an image at a location near a single focal point for far vision on the optical axis, and wherein each of the plurality of curved surfaces for near vision of the lens curve has a center of curvature on the optical axis and a radius of curvature, which is set so that a ray being incident on the corresponding curved surface and being parallel to the optical axis forms an image at a location near a single focal point for near vision on the optical axis, the method comprising the steps of: bringing an abrasive cloth of a soft material into tightly contact with a front curve of the multifocal contact lens by fluid pressure; and ausing a relative movement between the front curve and the abrasive cloth to polish the front curve.

According to still further aspect of the present invention, there is provided a method for producing a multifocal contact lens having a lens curve formed by alternately arranging a plurality of curved surfaces for far vision and a plurality of curved surfaces for near vision in the form of concentric zones, wherein each of the plurality of curved surfaces for far vision of the lens curve has a center of curvature on an optical axis and a radius of curvature, which is set so that a predetermined principal ray being incident on the corresponding curved surface and being parallel to the optical axis forms an image at a location near a single focal point for far vision on the optical axis, and each of the plurality of curved surfaces for near vision of the lens curve has a center of curvature on the optical axis and a radius of curvature, which is set so that a predetermined principal ray being incident on the corresponding curved surface and being parallel to the optical axis forms an image at a location near a single focal point for near vision on the optical axis, the method comprising the steps of: bringing an abrasive cloth of a soft material into tightly contact with a front curve of the multifocal contact lens by fluid pressure; and causing a relative movement between the front curve and the abrasive cloth to polish the front curve.

With the aforementioned constructions, the operation of the present invention will be described below.

According to the present invention, each of the curved surfaces for far vision of the lens curve may have a center of curvature on the optical axis, and a radius of curvature which is set so that a ray being incident on the corresponding curved surface for far vision and being parallel to the optical axis forms an image at a location near a single focal point for far vision. According to the present invention, there is no severe restriction that all of the radii of curvature of the respective curved surfaces for far vision must be equal to each other, so that it is possible to ensure a high degree of freedom when a lens is designed using the ray tracing method.

In addition, according to the present invention, it is required to arrange the centers of curvature of the curved surfaces for far vision on the optical axis. However, according to the present invention, the radii of curvature of the respective curved surfaces for far vision can be suitably set, and the centers of curvature of the curved surfaces for far vision can be sequentially moved. Therefore, when the ray tracing method is applied, the restriction that the centers of curvature must be arranged on the optical axis is not essential.

With respect to each of the curved surfaces for near vision, the foregoing is the same as that of the curved surfaces for far vision.

Therefore, in comparison with the contact lens shown in FIG. 5 and so forth, it is possible to considerably decrease the restrictions when the ray tracing method is applied, and it is possible to design a lens while ensuring a high degree of freedom. In addition, the centers of curvature of the respective curved surfaces can be arranged on the optical axis, and the spherical aberration can be removed by suitably deriving the shapes of the respective curved surface of the lens curve using the ray tracing method.

Alternatively, according to the present invention, each of the curved surfaces for far vision of the lens curve may have a center of curvature on the optical axis, and a radius of curvature which is set so that a ray being incident on the corresponding curved surface for far vision and being parallel to the optical axis passes through a location near a single focal point for far vision. This is the same with respect to each of the curved surfaces for near vision.

According to the present invention, two methods for selecting a predetermined principal ray are provided.

In one of the two selecting methods, there is selected a ray passing through a predetermined location in a zone width of each of all the curved surfaces for far vision and near vision, which include a curved surface for far vision containing the optical axis and a curved surface for near vision containing the optical axis, respectively. That is, in the case of the contact lens shown in FIG. 5 and so forth, the ray corresponding to the optical axis is selected as a principal ray with respect to the curved surface F1 for far vision and the curved surface N1 for near vision. However, according to the present invention, parallel rays passing through a predetermined location in a zone width of each of the curved surface F1 for far vision and the curved surface N1 for near vision are selected as principal rays similar to other curved surfaces F2, F3, . . . for far vision and curved surfaces N2, N3, . . . which are apart from the optical axis. Thus, also in the case of the curved surface F1 for far vision and the curved surface N1 for near vision, the spherical aberration can be removed similar to the other curved surfaces F2, F3, . . . for far vision and the other curved surfaces N2, N3, . . . for near vision.

Even if the spherical aberrations remain in the curved surface F1 for far vision and the curved surface N1 for near vision, the distribution of the remaining spherical aberrations can be the same as the distribution of the spherical aberrations remaining in the other curved surfaces F2, F3, . . . for far vision and the other curved surfaces N2, N3, . . . for near vision. As a result, each of the curved surfaces can have a uniform distribution of spherical aberrations around a focal point for far vision or a focal point for near vision, such as a Gaussian distribution of spherical aberrations. On the other hand, in the case of the contact lens shown in FIG. 5 and so forth, the distribution of spherical aberrations remaining in the curved surface F1 for far vision and the curved surface N1 for near vision and the distribution of spherical aberrations remaining in the other curved surface F2, F3, . . . for far vision and the other curved surfaces N2, N3, . . . for near vision are easy to, e.g., a Gaussian distribution and a non-gaussian distribution, respectively.

In the other selecting method, a ray corresponding to the optical axis is selected as a predetermined principal ray with respect to the curved surface for far vision containing the optical axis and the curved surface for near vision containing the optical axis, and a ray passing through a predetermined location in a zone width of each of the curved surfaces is selected as a predetermined principal ray with respect to the other curved surfaces for far vision and near vision. That is, similar to the contact lens shown in FIG. 5 and so forth, a ray corresponding to the optical axis is selected as a principal ray with respect to the curved surface F1 for far vision and the curved surface N1 for near vision. Therefore, the complicated ray tracing can be omitted with respect to the curved surface F1 for far vision and the curved surface N1 for near vision, so that it is possible to simplify the design. In addition, even if the ray corresponding to the optical axis is selected as the principal ray with respect to the curved surface F1 for far vision and the curved surface N1 for near vision, the spherical aberration can be disregarded as long as the zone widths of the curved surfaces F for far vision and so forth are small so that the approximation to paraxial rays can be established.

As mentioned above, according to the present invention, each of the plurality of curved surfaces for far vision of the lens curve may have a center of curvature on an optical axis and a radius of curvature, which is set so that a ray being incident on the corresponding curved surface and being parallel to the optical axis forms an image at a location near a single focal point for far vision on the optical axis, and each of the plurality of curved surfaces for near vision of the lens curve may have a center of curvature on the optical axis and a radius of curvature, which is set so that a ray being incident on the corresponding curved surface and being parallel to the optical axis forms an image at a location near a single focal point for near vision on the optical axis. Therefore, the spherical aberration of the portions for far vision and near vision can be removed, so that the user can obtain a clear visual acuity in both of the portions for far vision and near vision.

In addition, the zone width of each of the curved surfaces for far vision may vary in accordance with the distance between the corresponding curved surface for far vision and the optical axis, and the zone width of each of the curved surfaces for near vision may vary in accordance with the distance between the corresponding curved surface for near vision and the optical axis. Therefore, when the user reads a book or does desk work in a room or the like using the portions for near vision, the user is easy to see close range if wearing a contact lens having a great energy ratio of portion for near vision. In addition, the user can see far range through the portions for far vision.

When the user takes up a sport or has a drive mainly using the portions for far vision outdoors or the like, the user is easy to see far range if wearing a contact lens having a great energy ratio of portion for far vision. In addition, the user can see near range through the portions for near vision.

According to the present invention, the front curve may be polished by bringing an abrasive cloth of a soft material into tightly contact with the front curve of the contact lens by fluid pressure to cause the relative movement between the front curve and the abrasive cloth. Therefore, the abrasive cloth can be flexibly fitted to the shape of the curved surface of the front curve by fluid pressure, so that it is possible to uniformly polish the contact lens containing the boundary between the adjacent curved surfaces for far vision and near vision.

Furthermore, according to the present invention, the lens curve formed by alternately arranging a plurality of curved surfaces for far vision and a plurality of curved surfaces for near vision in the form of zones concentric with respect to the optical axis, may be a front curve or a base curve.

In addition, according to the present invention, a curved surface F1 for far vision may be provided as a curved surface containing the optical axis. Alternatively, a curved surface N1 for near vision may be substituted for the curved surface F1 for far vision as the curved surface containing the optical axis.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings.

DESCRIPTION OF THE PREFERRED EMBODIMENTS

Referring now to the accompanying drawings, the preferred embodiments of a multifocal contact lens according to the present invention will be described below.

Figure 2:
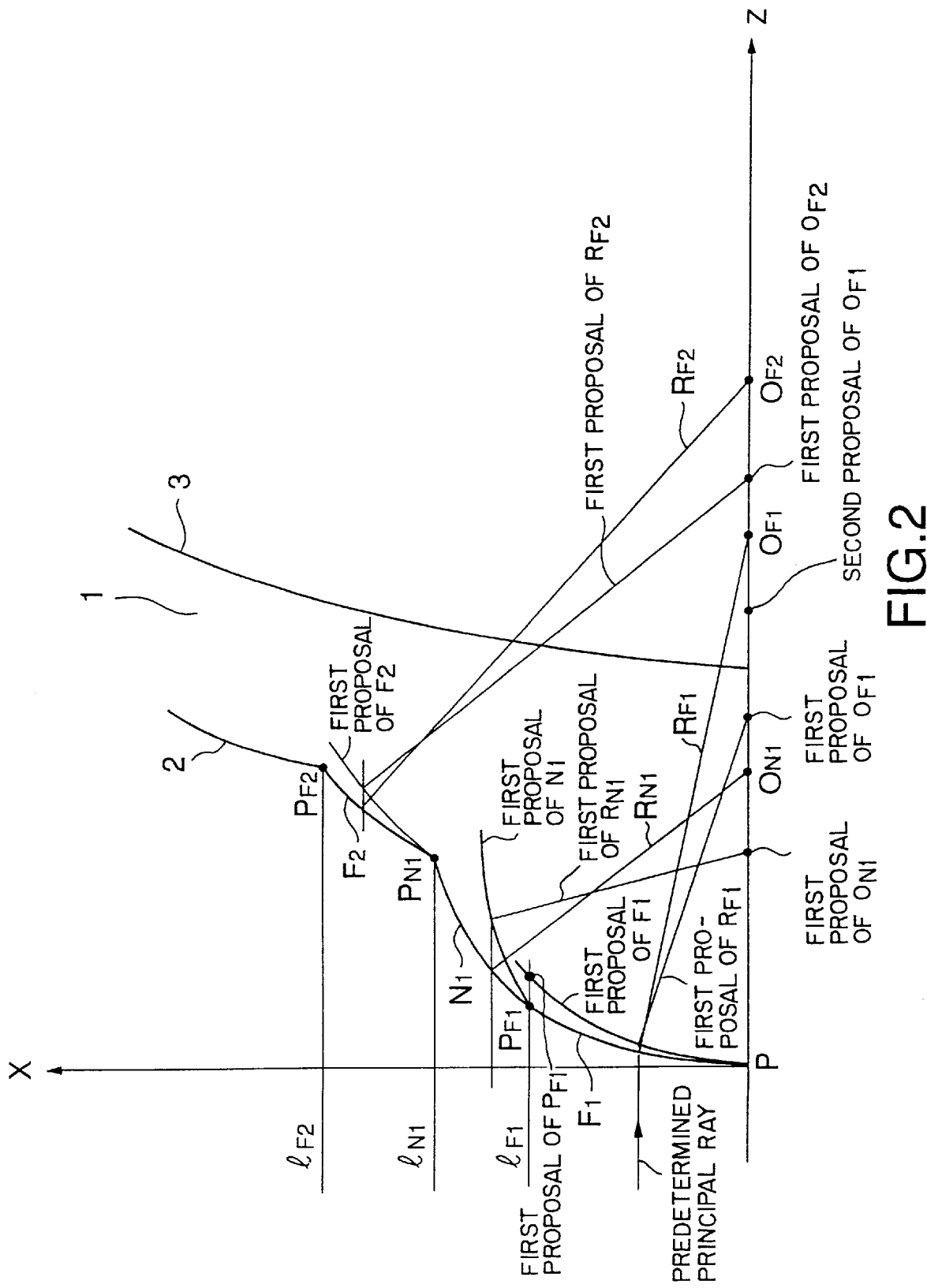
FIG. 2 is an enlarged sectional view showing a part of FIG. 1.

As shown in FIG. 2, a multifocal contact lens 1 has a front curve 2 serving as a lens curve formed by alternately arranging a plurality of curved surfaces F1, F2, . . . for far vision and a plurality of curved surfaces N1, N2, . . . for near vision in the form of concentric zones, and a base curve 3. It is assumed herein that the optical axis of the contact lens 1 corresponds to a Z-axis and the positive direction of the Z-axis is from the front curve 2 to the base curve 3. It is also assumed that an X-axis passes through the vertex P of the contact lens 1 and is perpendicular to the Z-axis.

The shape of the base curve 3 is individually set so as to correspond to the curved surface of the user's cornea. Furthermore, the base curve 3 may serve as a lens curve in place of the front curve 2.

In addition, the position of a focal point $F_F$ for far vision is calculated by a power of the portion for far vision which is derived on the basis of the values of the set shape of the curved surface of the base curve. In addition, the position of a focal point $F_N$ for near vision is calculated by a power of the portion for near vision which is derived by subtracting an added power from the power of the portion for far vision.

In addition, with respect to the curved surfaces F1, F2, . . . for far vision and the curved surfaces N1, N2, . . . for near vision on the front curve 2, the radii $R_{F1}$, $R_{F2}$, . . . of curvature of the portions for far vision, the radii $R_{N1}$, $R_{N2}$, . . . of curvature of the portions for near vision, the positions of centers $O_{F1}$, $O_{F2}$, . . . of curvature of the portions for far vision, and the positions of centers $O_{N1}$, $O_{N2}$, . . . of curvature of the portions for near vision are derived as follows.

That is, the curved surfaces F1, F2, . . . of the respective portions for far vision of the front curve 2 have the centers $O_{F1}$, $O_{F2}$, . . . of curvature on the optical axis (Z-axis). In addition, the curved surfaces F1, F2, . . . of the respective portions for far vision of the front curve 2 have radii $R_{F1}$, $R_{F2}$, . . . of curvature, respectively, which are set so that the rays, which are incident on the respective curved surfaces F1, F2, . . . for far vision and which are parallel to the optical axis, form an image at a location near a single focal point $F_F$ on the optical axis. The respective curved surfaces N1, N2, . . . for near vision of the front curve 2 have centers $O_{N1}$, $O_{N2}$, . . . of curvature on the optical axis. In addition, the respective curved surfaces N1, N2, . . . for near vision of the front curve 2 have radii $R_{N1}$, $R_{N2}$, . . . of curvature, which are set so that the rays, which are incident on the respective curved surfaces N1, N2, . . . for near vision and which are parallel to the optical axis, form an image at a location near a single focal point $F_N$ for near vision on the optical axis.

The positions of centers $O_{F1}$, $O_{F2}$, . . . of curvature and the radii $R_{F1}$, $R_{F2}$, . . . of curvature are set using the ray tracing method so that predetermined principal rays, which are incident on the respective curved surfaces F1, F2, . . . for far vision and which are parallel to the optical axis, pass through a location near the single focal point $F_F$ for far vision on the optical axis. The positions of centers $O_{N1}$, $O_{N2}$, . . . of curvature and the radii $R_{N1}$, $R_{N2}$, . . . of curvature are set so that predetermined principal rays, which are incident on the respective curved surfaces N1, N2, . . . for near vision and which are parallel to the optical axis, pass through a location near the single focal point $F_N$ of for near vision on the optical axis. Accordingly, to achieve the above, all the surfaces for near and far vision are spherical.

Figure 1:
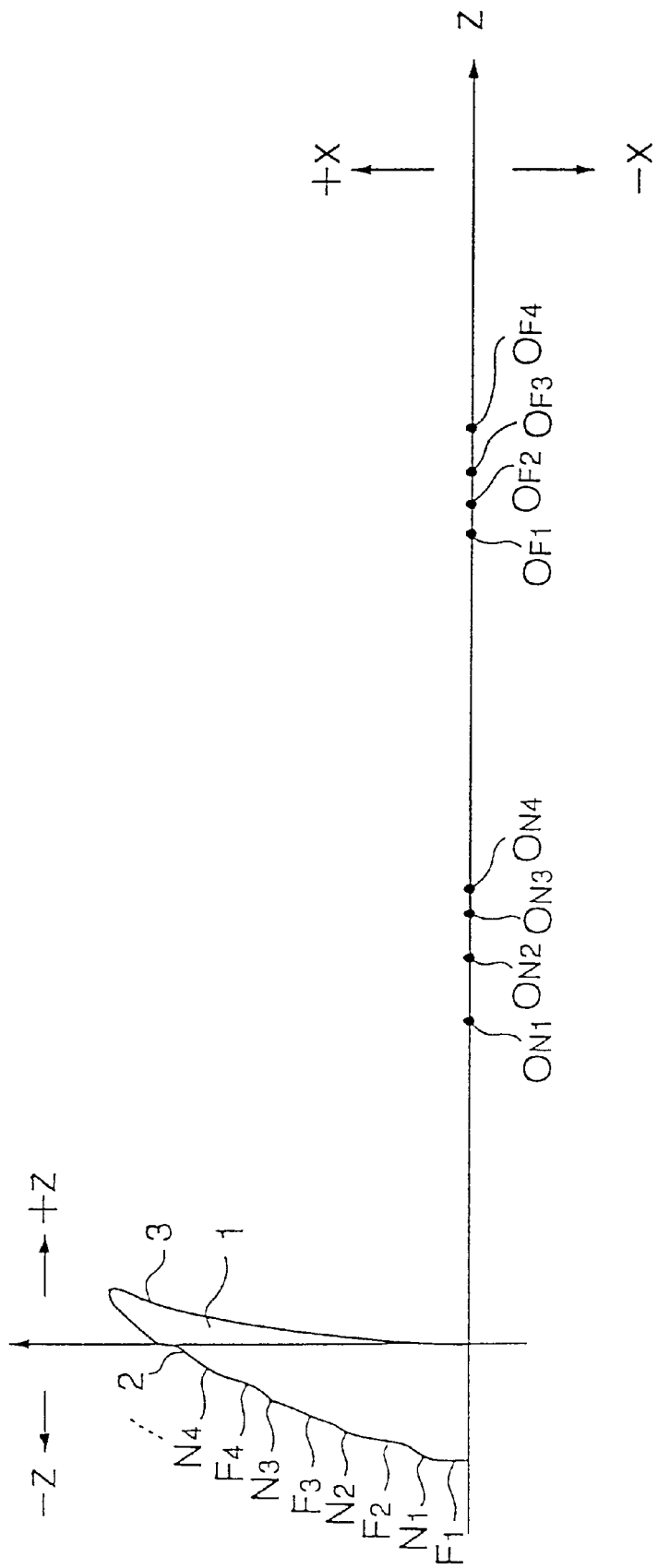
FIG. 1 is a sectional view showing centers of curvature of curved surfaces for far vision and near vision in the preferred embodiment of a contact lens according to the present invention.
Figure 3:
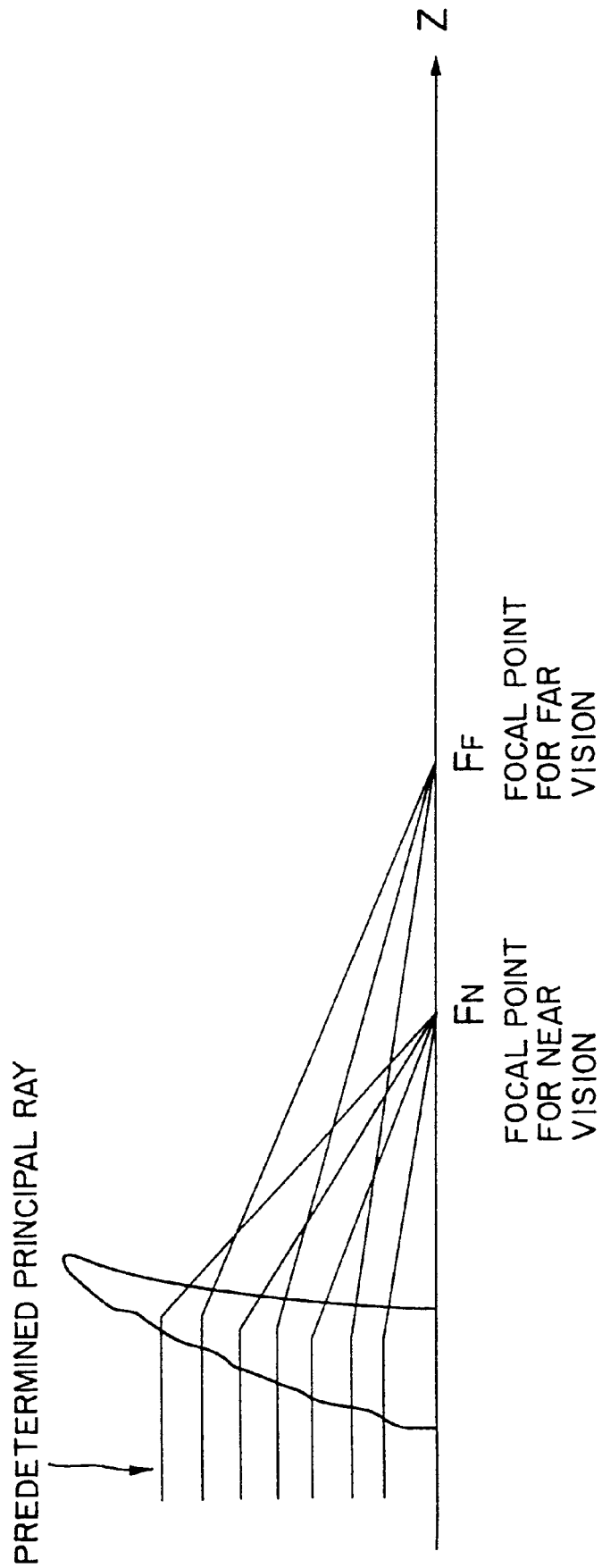
FIG. 3 is a sectional view showing focal points for far vision and near vision in the preferred embodiment of a contact lens according to the present invention.
Figure 4:
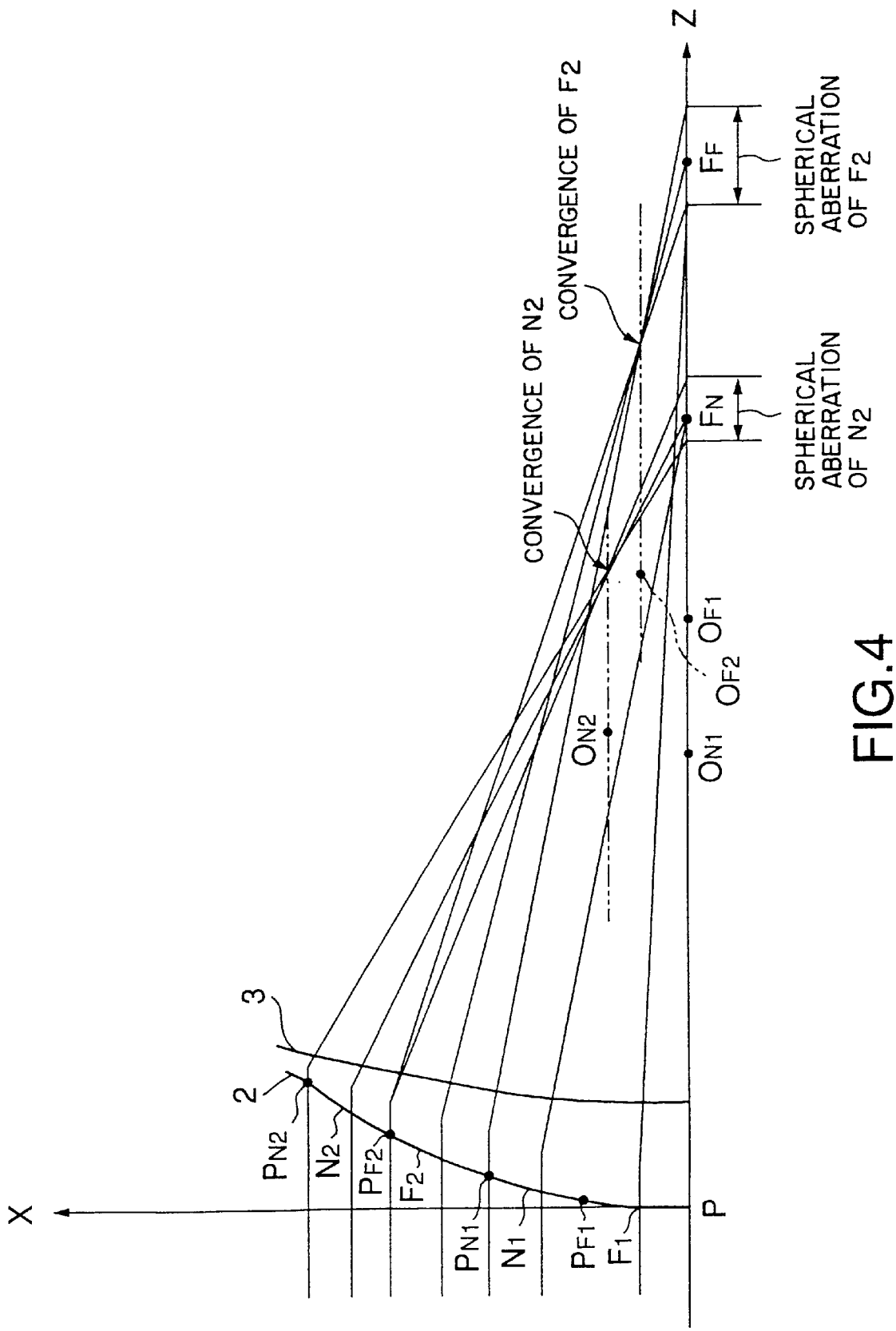
FIG. 4 is a sectional view showing centers of curvature of curved surfaces for far vision and near vision of a conventional contact lens.
Figure 5:
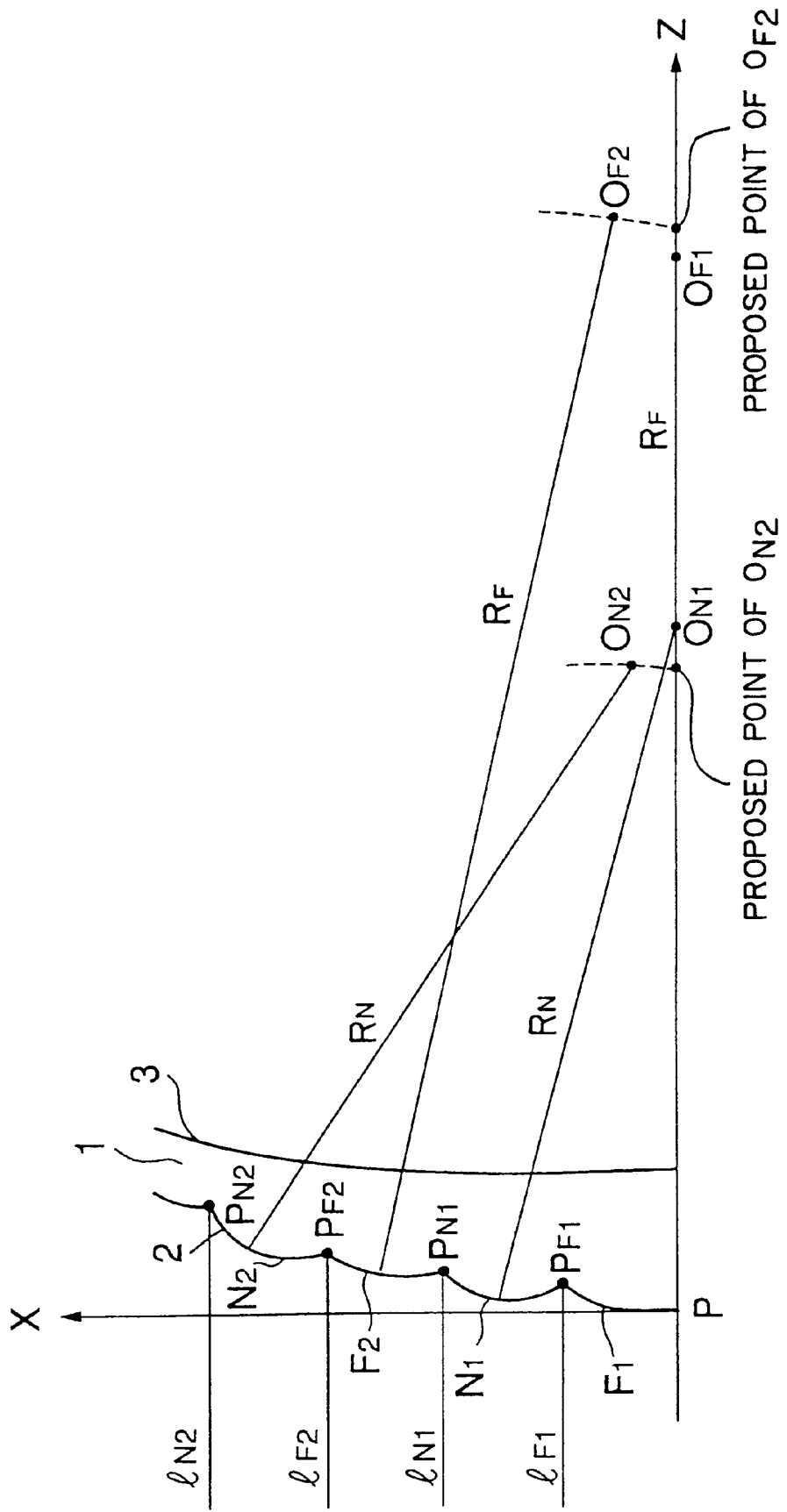
FIG. 5 is an enlarged sectional view showing a part of FIG. 4.
Figure 6:
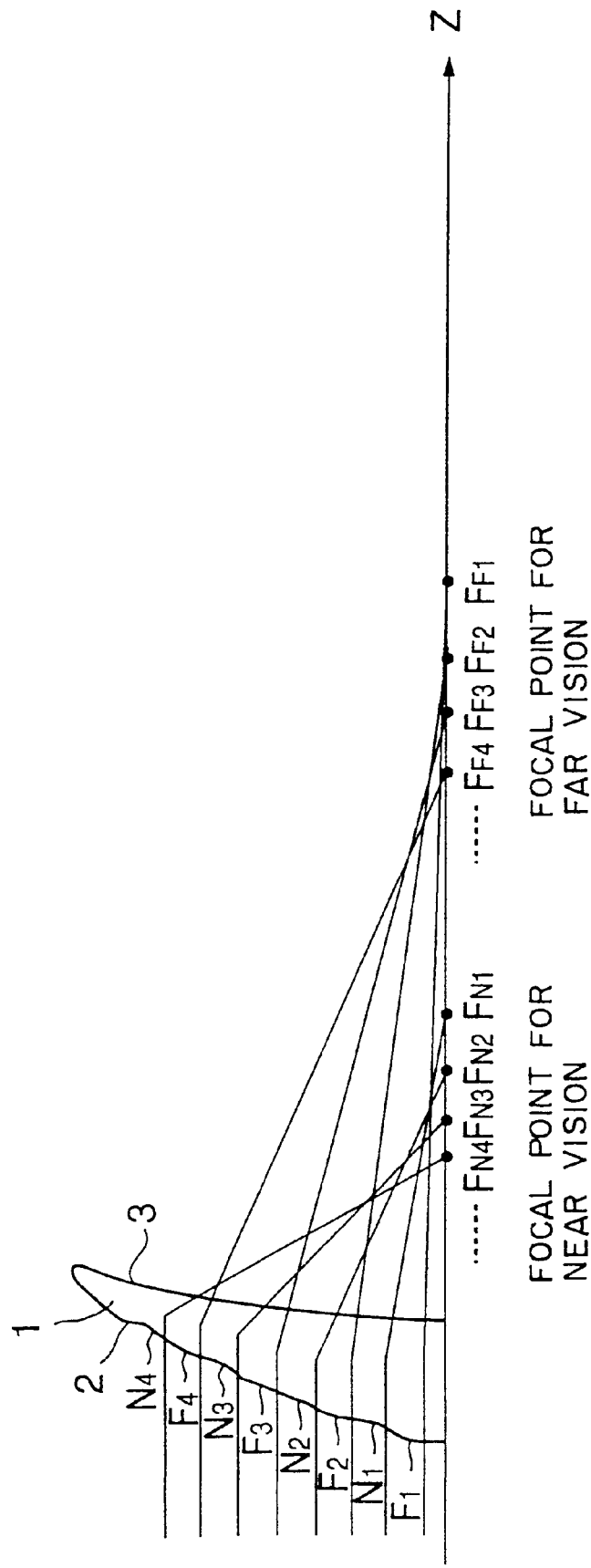
FIG. 6 is a sectional view showing focal points for far vision and near vision of a conventional contact lens.
Figure 7:
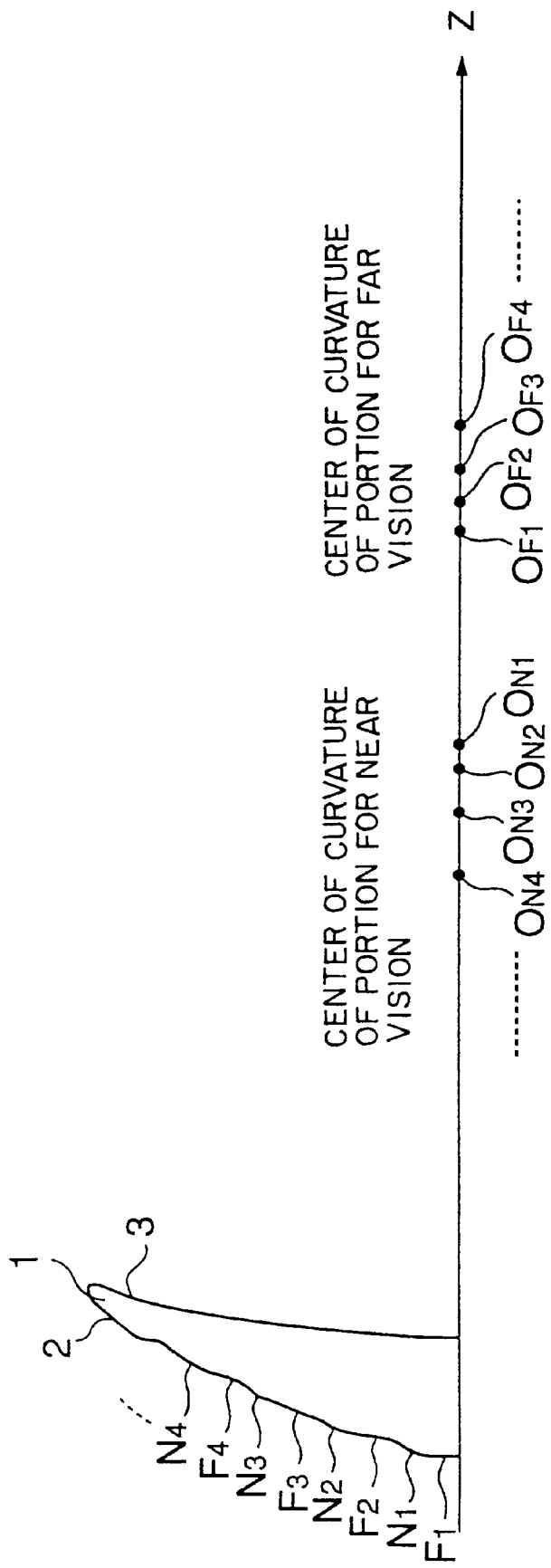
FIG. 7 is a sectional view showing centers of curvature of curved surfaces for far vision and near vision of a conventional contact lens.
Figure 8:
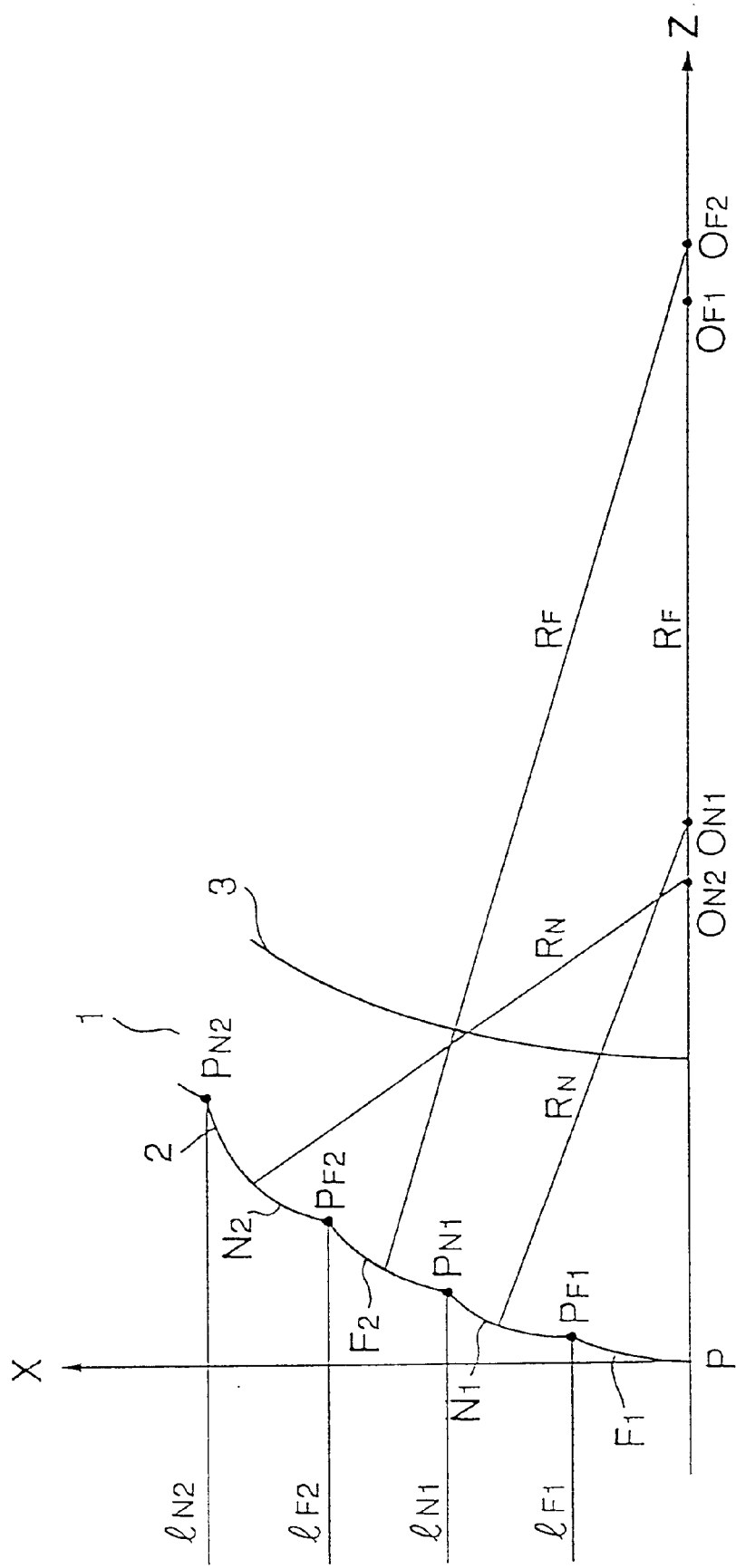
FIG. 8 is an enlarged sectional view showing a part of FIG. 7.

Furthermore, in the contact lens 1 illustrated in FIGS. 1 through 3, the zone widths of the respective curved surfaces F1, F2, . . . and N1, N2, . . . for far vision and near vision are wide. In addition, in the case of the respective curved surfaces F1, F2, . . . for far vision, the portions for far vision are formed as plus lenses in relation to the base curve 3, and in the case of the respective curved surfaces N1, N2, . . . for near vision, the portions for near vision are also formed as plus lenses in relation to the base curve 3.

The preferred embodiments of a multifocal contact lens according to the present invention will be described in detail below.

First, a first proposed radius for the radius $R_{F1}$ of curvature of the curved surface F1 for far vision is set on the basis of a desired power of the portion for far vision. Then, as shown in FIG. 2, the position on the optical axis, which is apart from the vertex P by the length of the first proposed radius for the radius $R_{F1}$ of curvature of the portion for far vision, is derived as a first proposed position for the center $O_{F1}$ of curvature of the curved surface F1 for far vision.

Then, a circle having the first proposed radius for the radius $R_{F1}$ of curvature is described about the first proposed position for the center $O_{F1}$ of curvature to derive an intersection position of this circle with a straight line $l_{F1}$ defining the zone width of the curved surface F1 for far vision. This intersection position is assumed to be a first proposed point for the point $P_{F1}$. The curved surface extending from the point P to the point $P_{F1}$ is derived as a first proposal for the curved surface F1 for far vision.

Specifically, the position of the center $O_{F1}$ of curvature is derived using the ray tracing method as follows.

First, parallel rays, which are parallel to the optical axis in the zone width between the optical axis and the straight line $l_{F1}$, are selected as predetermined principal rays to be incident on the first proposal for the curved surface F1 for far vision to derive a position at which the parallel rays intersect with the optical axis after outgoing the base curve 3.

Furthermore, as the predetermined principal rays for the curved surface F1 for far vision, parallel rays passing through the center in the direction of X in the zone width between the optical axis and the straight line $l_{F1}$ or rays corresponding to the optical axis are preferably selected. In a case where the parallel rays passing through the center in the direction of X in the zone width are selected as the predetermined principal rays, if the same principal rays are selected for all the other curved surfaces for far vision and near vision, it is possible to reduce the spherical aberration in the case of the curved surface F1 for far vision and the curved surface N1 for near vision similar to the other curved surfaces F2, F3, . . . for far vision and the other curved surfaces N2, N3, . . . for near vision. In addition, the distribution of the remaining spherical aberrations can be a uniform distribution of spherical aberrations over all the curved surfaces for far vision and near vision. On the other hand, in a case where the rays corresponding to the optical axis are selected as the predetermined principal rays, the complicated ray tracing can be omitted with respect to the curved surface F1 for far vision and the curved surface N1 for near vision, so that the design can be simplified.

The predetermined principal rays are selected by any one of the aforementioned methods.

Then, the positions, at which the predetermined principal rays thus selected intersect with the optical axis after outgoing the base curve 3, are derived. In a case where these positions are shifted from the focal point $F_F$ for far vision in a negative direction of the Z-axis, the first proposal for the radius $R_{F1}$ of curvature is slightly increased, and the increased value is defined as a second proposal for the radius $R_{F1}$ of curvature. Then, a circle having the same radius as the second proposal for the radius $R_{F1}$ of curvature is described about the point P to derive an intersection point of this circle with the optical axis. This intersection point is defined as a second proposal for the position of center $O_{F1}$ of curvature.

In addition, a circle having the same radius as the second proposal for the radius $R_{F1}$ of curvature is described about the position of the second proposal for the position of center $O_{F1}$ of curvature to derive an intersection point of this circle with the straight line $l_{F1}$ defining the zone width of the curved surface F1 for far vision. This intersection point is defined as a second proposal for the point $P_{F1}$ and the curved surface extending from the point P to the second proposal for the point $P_{F1}$ is defined as a second proposal for the curved surface F1 for far vision.

On the other hand, in a case where the positions, at which the predetermined principal rays intersect with the optical axis after outgoing the base curve 3, are shifted from the focal point $F_F$ for far vision in a positive direction of the Z-axis, the first proposal for the radius $R_{F1}$ of curvature is slightly decreased, and the decreased value is defined as a second proposal for the radius $R_{F1}$ of curvature. Then, a circle having the same radius as the second proposal for the radius $R_{F1}$ of curvature is described about the point P to derive an intersection point of this circle with the optical axis. This intersection point is defined as a second proposal for the position of center $O_{F1}$ of curvature. Similarly, a circle having the same radius as the second proposal for the radius $R_{F1}$ of curvature is described about the second proposal for the position of center $O_{F1}$ of curvature to derive an intersection point of this circle with the straight line $l_{F1}$ defining the zone width of the curved surface F1 for far vision. This intersection point is defined as a second proposal for the point $P_{F1}$, and the curved surface extending from the point P to the second proposal for the point $P_{F1}$ is defined as a second proposal for the curved surface F1 for far vision.

As mentioned above, the proposal for the radius $R_{F1}$ of curvature and the proposal for the center $O_{F1}$ of curvature are sequentially changed, and such operations are sequentially repeated until the predetermined principal rays incoming the front curve 2 and outgoing the base curve 3 pass through the focal point $F_F$ for far vision.

After such ray tracing operations are repeated, when the intersection points of the predetermined principal rays outgoing the base curve 3 with the optical axis are incident with the focal point $F_F$ for far vision or substantially incident therewith within an allowable range, the proposal for the center $O_{F1}$ of curvature is decided as a true position of center $O_{F1}$ of curvature on the optical axis, and the proposal for the radius $R_{F1}$ of curvature is decided as a true radius $R_{F1}$ of curvature. In addition, the proposal for the intersection point $R_{F1}$ is decided as a true intersection point $P_{F1}$, and the proposal for the curved surface F1 for far vision is decided as a true curved surface F1 for far vision.

Then, methods for deriving the position of center $O_{N1}$ of curvature, the radius $R_{N1}$ of curvature and the curved surface N1 for near vision on the basis of the aforementioned decided results will be described below.

First, a first proposal for the radius $R_{N1}$ of curvature is set on the basis of a desired power of the portion for near vision. Then, a circle having the same radius as the first proposal for the radius $R_{N1}$ of curvature is described about the point $P_{F1}$ on the decided curved surface F1 for far vision, to derive an intersection point of this circle with the optical axis. This intersection point is defined as a first proposal for the center $O_{N1}$ of curvature of the curved surface N1 for near vision.

Then, a circle having the same radius as the first proposal for the radius $R_{N1}$ of curvature is described about the first proposal for the center $O_{N1}$ of curvature to derive an intersection point of this circle with the straight line $l_{N1}$ defining the zone width of the curved surface N1 for near vision. This intersection point is defined as a first proposal for the point $P_{N1}$, and the curved surface extending from the decided point $P_{F1}$ to the first proposal for the point $P_{N1}$ is described as a first proposal for the curved surface N1 for near vision.

Then, in the same method as that for deriving the position of center $O_{F1}$ of curvature and the radius $R_{F1}$ of curvature, the position of center $O_{F1}$ of curvature and the radius $R_{N1}$ of curvature are derived using the ray tracing method as follows.

First, rays, which pass through the center of the zone between the straight line $l_{F1}$ and the straight line $l_{N1}$ in a direction of X and which are parallel to the optical axis, are selected as predetermined principal rays. The positions, at which the predetermined principal rays intersect with the optical axis after incoming the first proposal for the curved surface N1 for near vision and outgoing the base curve 3, are derived.

In a case where the derived position intersecting with the optical axis is shifted from the focal point $F_N$ for near vision in a direction of Z, the first proposal for the radius $R_{N1}$ of curvature is slightly increased as shown in FIG. 2, and the increased value is defined as a second proposal for the radius $R_{N1}$ of curvature. Then, a circle having the same radius as the second proposal for the radius $R_{N1}$ is described about the decided point $P_{F1}$ to derive an intersection point of this circle with the optical axis. This intersection is defined as a proposal for the center $O_{N1}$ of curvature. In addition, a circle having the same radius as the second proposal for the radius $R_{N1}$ of curvature is described about the second proposal for the position of center $O_{N1}$ of curvature to derive an intersection point of this circle with the straight line $l_{N1}$ defining the zone width of the curved surface N1 for near vision. This intersection point is defined as a second proposal for the point $P_{N1}$, and the curved surface extending the decided point $P_{F1}$ to the point $P_{N1}$ is defined as a second proposal for the curved surface N1 for near vision.

On the other hand, in a case where the positions, at which the predetermined principal rays intersect with the optical axis after outgoing the base curve 3, are shifted from the focal point $F_N$ for near vision in a positive direction of the Z-axis, the first proposal for the radius $R_{N1}$ of curvature is slightly decreased, and the decreased value is defined as a second proposal for the radius $R_{N1}$ of curvature. Then, a circle having the same radius as the second proposal for the radius $R_{N1}$ of curvature is described about the decided point $P_{F1}$ to derive an intersection point of this circle with the optical axis. This intersection point is defined as a second proposal for the center $O_{N1}$ of curvature. In addition, a circle having the same radius as the second proposal for the radius $R_{N1}$ of curvature is described about the second proposal for the center $O_{N1}$ of curvature to derive an intersection point of this circle with the straight line $l_{N1}$ defining the zone width of the curved surface N1 for near vision. This intersection point is defined as a second proposal for the point $P_{N1}$, and the curved surface extending from the decided point $P_{F1}$ to the second proposal for the point $P_{N1}$ is defined as a second proposal for the curved surface N1 for near vision.

As mentioned above, the proposal for the radius $R_{N1}$ of curvature and the proposal for the center $O_{N1}$ of curvature are sequentially changed. Such operations are sequentially repeated until the predetermined principal rays pass through the focal point $F_N$ for near vision after incoming the front curve 2 and outgoing the base curve 3.

After such ray tracing operations are repeated, when the intersection point of the predetermined principal rays outgoing the base curve 3 with the optical axis is incident with the focal point $F_N$ for near vision or substantially incident therewith within an allowable range, the proposal for the center $O_{N1}$ of curvature is decided as a true position of center $O_{N1}$ of curvature on the optical axis, and the proposal for the radius $R_{N1}$ of curvature is decided as a true radius $R_{N1}$ of curvature. In addition, the proposal for the intersection point $R_{N1}$ is decided as a true intersection point $P_{N1}$, and the proposal for the curved surface N1 for near vision is decided as a true curved surface N1 for near vision.

Then, methods for deriving the position of center $O_{F2}$ of curvature, the radius $R_{F2}$ of curvature and the curved surface F2 for far vision on the basis of the aforementioned decided results will be described below.

First, a first proposal for the radius $R_{F2}$ of curvature is set on the basis of a desired power for far vision. Then, a circle having the same radius as the first proposal for the radius $R_{F2}$ of curvature is described about the point $P_{N1}$ on the decided curved surface N1 for near vision to derive an intersection point of this circle with the optical axis. This intersection point is defined as a first proposal for the center $O_{F2}$ of curvature of the curved surface F2 for far vision.

Then, a circle having the same radius as the first proposal for the radius $R_{F2}$ of curvature is described about the first proposal for the position of center $O_{F2}$ of curvature to derive an intersection point of this circle with the straight line $l_{F2}$ defining the zone width of the curved surface F2 for far vision. This intersection point is defined as a first proposal for the point $P_{F2}$, and the curved surface extending from the decided point $P_{N1}$ to the first proposal for the point $P_{F2}$ is defined as a first proposal for the curved surface F2 for far vision.

Then, in the same methods as those for deriving the position of center $O_{F1}$ of curvature, the radius $R_{F1}$ of curvature and so forth, the position of center $O_{F2}$ of curvature and the radius $R_{F2}$ of curvature are derived using the ray tracing method as follows.

First, rays, which pass through the center of the zone between the straight line $l_{N1}$ and the straight line $l_{F2}$ in a direction of X and which are parallel to the optical axis, are selected as predetermined principal rays. The positions, at which the predetermined principal rays intersect with the optical axis after incoming the first proposal for the curved surface F2 for far vision and outgoing the base curve 3, are derived.

In a case where the derived position intersecting with the optical axis is shifted from the focal point $F_F$ for far vision in a negative direction of Z-axis, the first proposal for the radius $R_{F2}$ of curvature is slightly increased as shown in FIG. 2, and the increased value is defined as a second proposal for the radius $R_{F2}$ of curvature. Then, a circle having the same radius as the second proposal for the radius $R_{F2}$ is described about the decided point $P_{N1}$ to derive an intersection point of this circle with the optical axis. This intersection is defined as a second proposal for the center $O_{F2}$ of curvature. In addition, a circle having the same radius as the second proposal for the radius $R_{F2}$ of curvature is described about the second proposal for the center $O_{F2}$ of curvature to derive an intersection point of this circle with the straight line $l_{F2}$ defining the zone width of the curved surface F2 for far vision. This intersection point is defined as a second proposal for the point $P_{F2}$, and the curved surface extending the decided point $P_{N1}$ to the second proposal for the point $P_{F2}$ is defined as a second proposal for the curved surface F2 for far vision.

On the other hand, in a case where the positions, at which the predetermined principal rays intersect with the optical axis after outgoing the base curve 3, are shifted from the focal point $F_F$ for far vision in a positive direction of the Z-axis, the first proposal for the radius $R_{F2}$ of curvature is slightly decreased, and the decreased value is defined as a second proposal for the radius $R_{F2}$ of curvature. Then, a circle having the same radius as the second proposal for the radius $R_{F2}$ of curvature is described about the decided point $P_{N1}$ to derive an intersection point of this circle with the optical axis. This intersection point is defined as a second proposal for the center $O_{F2}$ of curvature. In addition, a circle having the same radius as the second proposal for the radius $R_{F2}$ of curvature is described about the second proposal for the position of center $O_{F2}$ of curvature to derive an intersection point of this circle with the straight line $l_{F2}$ defining the zone width of the curved surface F2 for far vision. This intersection point is defined as a second proposal for the point $P_{F2}$, and the curved surface extending from the decided point $P_{N1}$ to the second proposal for the point $P_{F2}$ is defined as a second proposal for the curved surface F2 for far vision.

As mentioned above, the proposal for the radius $R_{F2}$ of curvature and the proposal for the center $O_{F2}$ of curvature are sequentially changed. Such operations are sequentially repeated until the predetermined principal rays pass through the focal point $F_F$ for far vision after incoming the front curve 2 and outgoing the base curve 3.

After such ray tracing operations are repeated, when the intersection point of the predetermined principal rays outgoing the base curve 3 with the optical axis is incident with the focal point $F_F$ for far vision or substantially incident therewith within an allowable range, the proposal for the center $O_{F2}$ of curvature is decided as a true position of center $O_{F2}$ of curvature on the optical axis, and the proposal for the radius $R_{F2}$ of curvature is decided as a true radius $R_{F2}$ of curvature. In addition, the proposal for the intersection point $P_{F2}$ with the straight line $l_{F2}$ defining the zone width is decided as a true intersection point, and the proposal for the curved surface F2 for far vision is decided as a true curved surface F2 for far vision.

By the same operations, the other centers $O_{F3}$, $O_{F4}$, . . . and $O_{N2}$, $O_{N3}$, . . . , the other radii $R_{F3}$, $R_{F4}$, . . . and $R_{N2}$, $R_{N3}$, . . . of curvature, and the other curved surfaces F3, F4, . . . and N2, N3, . . . are derived.

The characteristics of the contact lens 1 thus derived are shown in FIGS. 1 and 3. As shown in FIG. 1, all of the centers $O_{F1}$, $O_{F2}$, . . . of curvature of the portions for far vision and the centers $O_{N1}$, $O_{N2}$, . . . are located on the optional axis.

In addition, as schematically shown in FIG. 3, the rays, which are parallel to the rays incoming the respective curved surface F1, F2, ... of curvature for far vision of the front curve 2, form an image at a location near the single focal point $F_F$ for far vision on the optical axis, and the rays, which are parallel to the rays incoming the respective curved surfaces N1, N2, ... of curvature of for near vision of the front curve 2, form an image at a location near the single focal point $F_F$ for near vision on the optical axis.

As mentioned above, according to the present invention, there is removed the severe restrictions that all the radii of curvature of the respective curved surfaces F1, F2, ... for far vision must be equal to each other, and all of the centers $O_{F1}$, $O_{F2}$, ... of curvature of the respective curved surfaces F1, F2, ... for far vision are located on the optical axis. Therefore, it is possible to ensure a high degree of freedom when a lens is designed by the ray tracing method, and it is possible to remove spherical aberrations of the respective portions for far vision.

Similarly, there is removed the severe restrictions that all the radii of curvature of the respective curved surfaces N1, N2, ... for near vision must be equal to each other, and all of the respective centers $O_{N1}$, $O_{N2}$, ... of curvature are located on the optical axis. Therefore, it is possible to ensure a high degree of freedom when a lens is designed by the ray tracing method, and it is possible to remove spherical aberrations of the respective portions for near vision.

As a result, the user can obtain a clear visual acuity in both of portions for far vision and near vision.

In addition, in the cases of the curved surface F1 for far vision and the curved surface N1 for near vision as in the case of the other curved surfaces F2, F3, ... for far vision and the other curved surfaces N2, N3, ... for near vision, it is possible to remove spherical aberrations by selecting parallel rays passing through predetermined positions, e.g., the centers, in the respective zone width as the predetermined principal rays with respect to all of the curved surfaces F1, F2, ... for far vision and the curved surfaces N1, N2, ... for near vision. In addition, even if spherical aberrations remain in the curved surface F1 for far vision and the curved surface N1 for near vision, the distribution of the remaining spherical aberrations can be the same as the distribution of spherical aberrations remaining in the other curved surfaces F2, F3, ... for far vision and the other curved surfaces N2, N3, ... for near vision, and the respective curved surfaces can have a uniform distribution of spherical aberrations around the focal point for far vision or the focal point for near vision so as to have, e.g., a Gaussian distribution of spherical aberrations.

In addition, if rays corresponding to the optical axis are selected as the predetermined principal rays with respect to the curved surface F1 for far vision containing the optical axis or the curved surface N1 for near vision containing the optical axis, or if rays passing through predetermined positions, e.g., centers, in the zone widths of the respective curved surfaces are selected as the predetermined principal rays with respect to the other curved surfaces F2, F3, ... for far vision and the other curved surfaces N2, N3, ... for near vision, it is possible to omit the complicated ray tracing, so that the design can be simplified.

In addition, as can be seen from FIG. 1, as the distances between the respective curved surfaces F1, F2, ... for far vision of the front curve 2 and the optical axis are increased, the radii of curvature of the curved surfaces F1, F2, ... for far vision are increased, and the distances between the centers $O_{F1}$, $O_{F2}$, ... of curvature thereof and the front curve 2 are increased. In addition, as the distances between the respective curved surfaces N1, N2, ... for near vision of the front curve 2 and the optical axis are increased, the radii of curvature of the curved surfaces N1, N2, ... for near vision are increased, and the distances between the centers $O_{N1}$, $O_{N2}$, ... of curvature thereof and the front curve 2 are increased.

Furthermore, as mentioned above, in the contact lens 1 illustrated in FIGS. 1 through 3, the zone widths of the respective curved surfaces F1, F2, ... for far vision and N1, N2, ... for near vision are wide. In addition, the portions for far vision are formed as plus lenses in relation to the base curve 3, and the portions for near vision are also formed as plus lenses in relation to the base curve 3.

However, the present invention should not be limited thereto, but the undermentioned combinations of plus lenses and minus lenses for the portions for far vision and near vision can remove spherical aberration.

In addition, in the undermentioned combinations of plus lenses and minus lenses for the portions for far vision and near vision, there are the following characteristics.

In a case where the zone widths of the respective curved surfaces for far vision and near vision are wide, when the portions for far vision are minus lenses and the portions for near vision are plus lenses, or when both of the portions for far vision and near vision are minus lenses, the spherical aberrations of the respective curved surfaces for far vision and near vision can be removed.

However, when the portions for far vision are minus lenses and the portions for near vision are plus lenses, as the distances between the respective curved surfaces F1, F2, ... for far vision of the front curve 2 and the optical axis are increased, the radii of curvature are decreased, and the distances between the centers $O_{F1}$, $O_{F2}$, ... of curvature and the front curve 2 are decreased. In addition, as the distances between the respective curved surfaces N1, N2, ... for near vision of the front curve 2 and the optical axis are increased, the radii of curvature are increased, and the distances between the centers $O_{N1}$, $O_{N2}$, ... of curvature and the front curve 2 are increased.

In addition, when both of the portions for far vision and near vision are minus lenses, as the distances between the respective curved surfaces F1, F2, ... for far vision of the front curve 2 and the optical axis are increased, the radii of curvature are decreased, and the distances between the centers $O_{F1}$, $O_{F2}$, ... of curvature and the front curve 2 are decreased. In addition, as the distances between the respective curved surfaces N1, N2, ... for near vision of the front curve 2 and the optical axis are increased, the radii of curvature are decreased, and the distances between the centers $O_{N1}$, $O_{N2}$, ... of curvature and the front curve 2 are decreased while the centers are located on the optical axis.

On the other hand, in a case where the zone widths of the respective curved surfaces for far vision and near vision are narrow, when both of the portions for far vision and near vision are plus lenses, even if the distances between the respective curved surfaces F1, F2, ... for far vision of the front curve 2 and the optical axis are increased, the radii of curvature are substantially the same, but the distances between the centers $O_{F1}$, $O_{F2}$, ... of curvature and the front curve 2 are increased. In addition, as the distances between the respective curved surfaces N1, N2, ... for near vision of the front curve 2 and the optical axis are increased, the radii of curvature are increased, and the distances between the centers $O_{N1}$, $O_{N2}$, ... of curvature and the front curve 2 are increased while the centers are located on the optical axis.

In addition, when the portions for far vision are minus lenses and the portions for near vision are plus lenses, as the distances between the respective curved surfaces F1, F2, . . . for far vision of the front curve 2 and the optical axis are increased, the radii of curvature are decreased, and the centers $O_{F1}$, $O_{F2}$, . . . of curvature are alternately located on the optical axis at a far position and a near position from the front curve 2. In addition, as the distances between the respective curved surfaces N1, N2, . . . for near vision of the front curve 2 and the optical axis are increased, the radii of curvature are substantially the same, but the distances between the centers $O_{N1}$, $O_{N2}$, . . . of curvature and the front curve 2 are increased.

Using numeric values, the improvements of spherical aberration according to the present invention compared with the conventional design will be described below.

Figure 9:
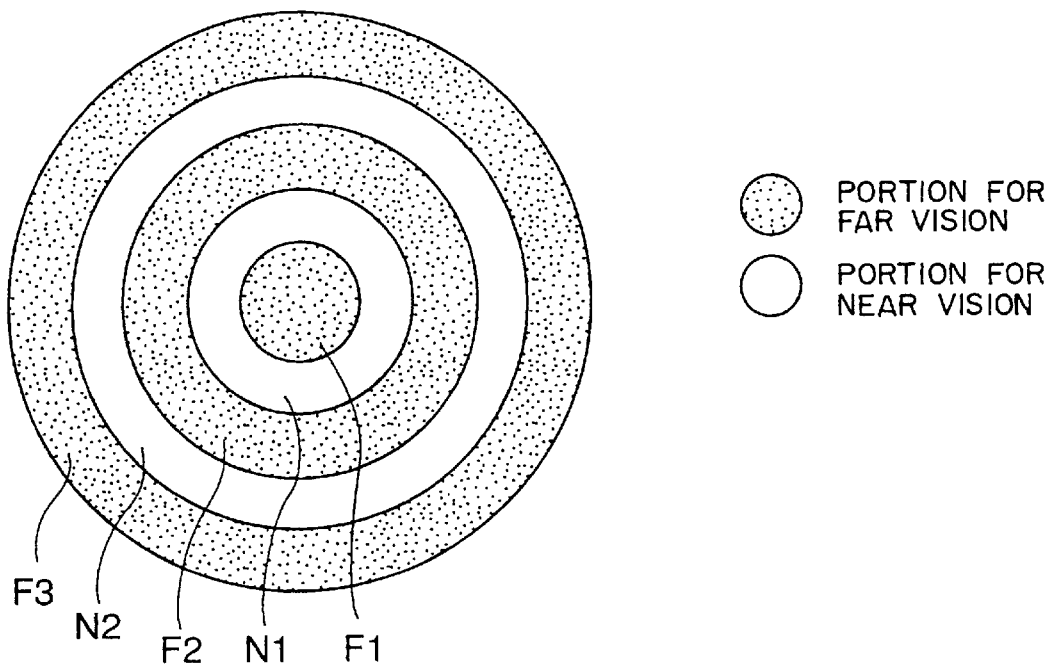
FIG. 9 is a plan view of the first through eighth preferred embodiments of a contact lens according to the present invention.

The contact lens used herein is a water-containing soft contact leans, and the radius of curvature of the base curve 3 is 8.0 mm in a moisture state. As shown in FIG. 9, the zone widths of the portions for far vision are equal to each other to be 0.5 mm, and the zone widths of the portions for near vision are equal to each other to be 1.0 mm. In this case, the area ratio in the optical zone is 60% with respect to the portions for far vision and 40% with respect to the portions for near vision.

In the tables showing the comparative results, the terms "first zone", "second zone", "third zone", "fourth zone", . . . are used in the order of the first zone for far vision, the first zone for near vision, the second zone for far vision, the second zone for near vision, . . . outside from the center of the contact lens, respectively. Therefore, in the respective tables, the term "first zone" means the first zone for far vision comprising the curved surface F1 for far vision and the base curve 3, the term "second zone" means the first zone for near vision comprising the curved surface N1 for near vision and the base curve 3, the term "third zone" means the second zone for far vision comprising the curved surface F2 for far vision and the base curve 3, and the term "fourth zone" means the second zone for near vision comprising the curved surface N2 for near vision and the base curve 3. In addition, the radii of curvature, the X-coordinate and Y-coordinate of the curved surfaces corresponding to the first, second, third, fourth, zones, indicate the radii of curvature of the respective curved surfaces F1, N1, F2, N2, . . . , and the X-coordinate and Y-coordinate of the centers $O_{F1}$, $O_{N2}$, $O_{F2}$, $O_{N2}$, . . . of curvature of the respective curved surfaces F1, N1, F2, N2, . . . , respectively.

In addition, the amount improved by the design of the present invention compared with the conventional design is shown by the improved amount of spherical aberration. The improved amount of spherical aberration is shown by the difference in spherical aberration in the fifth zone (F3) for example.

First, referring to FIG. 9, the first through eighth preferred embodiments are shown in Tables 1 through 8. Furthermore, in the following tables, the radius of curvature is expressed by R, and the X-coordinate and Y-coordinate are expressed by X and Y, respectively.

(1) Example 1

When the power for far vision is +3.00D (diopter), the added power for near vision is +2.00D and the zone widths of the portions for far vision and near vision are 1 mm, the comparative results are shown in Table 1.

TABLE 1

|  | The Present Invention | | | Conventional Design | | |
| --- | --- | --- | --- | --- | --- | --- |
|  | R(mm) | X(mm) | Z(mm) | R(mm) | X(mm) | Z(mm) |
| First Zone | 7.70 | 0.00000 | 7.69745 | 7.70 | 0.00000 | 7.69745 |
| Second Zone | 7.48 | 0.00000 | 7.69745 | 7.46 | 0.00300 | 7.46961 |
| Third Zone | 7.72 | 0.00000 | 7.74434 | 7.70 | 0.00750 | 7.72237 |
| Fourth Zone | 7.58 | 0.00000 | 7.60454 | 7.46 | 0.05625 | 7.49658 |
| Fifth Zone | 7.82 | 0.00000 | 7.88856 | 7.70 | 0.07050 | 7.78824 |
| Improved Amount of Spherical Aberration |  |  | 0.36D |  |  |  |

As can be seen from Table 1, in the portions for far vision, the radius of curvature is monotonously increased and the Z-coordinate is also monotonously increased. On the other hand, in the portions for near vision, the radius of curvature is monotonously increased and the Z-coordinate is also monotonously increased. In addition, in the portions for both of far vision and near vision, all of the X-coordinates are zero. According to the present invention, the spherical aberration was improved by 0.36D (2) Example 2

When the power for far vision is −3.00D (diopter), the added power for near vision is +4.00D and the zone widths of the portions for far vision and near vision are 1 mm, the comparative results are shown in Table 2.

TABLE 2

|  | The Present Invention | | | Conventional Design | | |
| --- | --- | --- | --- | --- | --- | --- |
|  | R(mm) | X(mm) | Z(mm) | R(mm) | X(mm) | Z(mm) |
| First Zone | 8.43 | 0.00000 | 8.42885 | 8.43 | 0.00000 | 8.42885 |
| Second Zone | 7.89 | 0.00000 | 7.89743 | 7.89 | 0.00150 | 7.89013 |
| Third Zone | 8.39 | 0.00000 | 8.41754 | 8.43 | −0.01188 | 8.45522 |
| Fourth Zone | 7.93 | 0.00000 | 7.92664 | 7.89 | 0.01725 | 7.89155 |
| Fifth Zone | 8.30 | 0.00000 | 8.36429 | 8.43 | −0.07096 | 8.47421 |
| Improved Amount of Spherical Aberration |  |  | 0.69D |  |  |  |

As can be seen from Table 2, in the portions for far vision, the radius of curvature is monotonously decreased and the Z-coordinate is monotonously increased. On the other hand, in the portions for near vision, the radius of curvature is monotonously increased and the Z-coordinate is also monotonously increased. In addition, in the portions for both of far vision and near vision, all of the X-coordinates are zero. According to the present invention, the spherical aberration was improved by 0.69D.

(3) Example 3

When the power for far vision is −3.00D (diopter), the added power for near vision is +2.00D and the zone widths of the portions for far vision and near vision are 1 mm, the comparative results are shown in Table 3.

TABLE 3

|  | The Present Invention | | | Conventional Design | | |
| --- | --- | --- | --- | --- | --- | --- |
|  | R(mm) | X(mm) | Z(mm) | R(mm) | X(mm) | Z(mm) |
| First Zone | 8.43 | 0.00000 | 8.43147 | 8.43 | 0.00000 | 8.42768 |
| Second Zone | 8.15 | 0.00000 | 8.15344 | 8.15 | 0.00150 | 8.15344 |
| Third Zone | 8.39 | 0.00000 | 8.41006 | 8.43 | −0.01188 | 8.44775 |
| Fourth Zone | 8.14 | 0.00000 | 8.14723 | 8.15 | −0.00487 | 8.15778 |
| Fifth Zone | 8.30 | 0.00000 | 8.34659 | 8.43 | −0.06771 | 8.45207 |
| Improved Amount of Spherical Aberration |  |  | 0.31D |  |  |  |

As can be seen from Table 3, in the portions for far vision, the radius of curvature is monotonously decreased and the Z-coordinate is also monotonously decreased. On the other hand, in the portions for near vision, the radius of curvature is monotonously decreased and the Z-coordinate is also monotonously decreased. In addition, in the portions for both of far vision and near vision, all of the X-coordinates are zero. According to the present invention, the spherical aberration was improved by 0.31D.

(4) Example 4

When the power for far vision is +5.00D (diopter), the added power for near vision is +4.00D and the zone widths of the portions for far vision and near vision are 1 mm, the comparative results are shown in Table 4.

TABLE 4

| | The Present Invention | | | Conventional Design | | |
|---|---|---|---|---|---|---|
| | R(mm) | X(mm) | Z(mm) | R(mm) | X(mm) | Z(mm) |
| First Zone | 7.47 | 0.00000 | 7.47213 | 7.47 | 0.00000 | 7.47213 |
| Second Zone | 7.07 | 0.00000 | 7.07589 | 7.04 | 0.00638 | 7.04723 |
| Third Zone | 7.52 | 0.00000 | 7.55200 | 7.47 | 0.01650 | 7.50563 |
| Fourth Zone | 7.25 | 0.00000 | 7.26278 | 7.04 | 0.10013 | 7.08099 |
| Fifth Zone | 7.67 | 0.00000 | 7.76545 | 7.47 | 0.11400 | 7.60798 |
| Improved Amount of Spherical Aberration | | | 0.64D | | | |

As can be seen from Table 4, in the portions for far vision, the radius of curvature is monotonously increased and the Z-coordinate is also monotonously increased. On the other hand, in the portions for near vision, the radius of curvature is monotonously increased and the Z-coordinate is also monotonously increased. In addition, in the portions for both of far vision and near vision, all of the X-coordinates are zero. According to the present invention, the spherical aberration was improved by 0.64D.

(5) Example 5

When the power for far vision is −5.00D (diopter), the added power for near vision is +2.00D and the zone widths of the portions for far vision and near vision are 1 mm, the comparative results are shown in Table 5.

TABLE 5

| | The Present Invention | | | Conventional Design | | |
|---|---|---|---|---|---|---|
| | R(mm) | X(mm) | Z(mm) | R(mm) | X(mm) | Z(mm) |
| First Zone | 8.72 | 0.00000 | 8.72457 | 8.72 | 0.00000 | 8.72457 |
| Second Zone | 8.14 | 0.00000 | 8.14866 | 8.14 | 0.00000 | 8.14866 |
| Third Zone | 8.65 | 0.00000 | 8.67507 | 8.72 | −0.02250 | 8.74906 |
| Fourth Zone | 8.14 | 0.00000 | 8.13482 | 8.14 | −0.00433 | 8.14310 |
| Fifth Zone | 8.48 | 0.00000 | 8.54035 | 8.72 | −0.12837 | 8.74566 |
| Improved Amount of Spherical Aberration | | | 0.53D | | | |

As can be seen from Table 5, in the portions for far vision, the radius of curvature is monotonously decreased and the Z-coordinate is also monotonously decreased. On the other hand, in the portions for near vision, the radii of curvature are substantially the same and the Z-coordinate is monotonously decreased. In addition, in the portions for both of far vision and near vision, all of the X-coordinates are zero. According to the present invention, the spherical aberration was improved by 0.53D.

(6) Example 6

When the power for far vision is +3.00D (diopter), the added power for near vision is +2.00D and the zone widths of the portions for far vision and near vision are 0.5 mm, the comparative results are shown in Table 6.

TABLE 6

| | The Present Invention | | | Conventional Design | | |
|---|---|---|---|---|---|---|
| | R(mm) | X(mm) | Z(mm) | R(mm) | X(mm) | Z(mm) |
| First Zone | 7.70 | 0.00000 | 7.69691 | 7.70 | 0.00000 | 7.69691 |
| Second Zone | 7.46 | 0.00000 | 7.47028 | 7.46 | 0.00000 | 7.47028 |
| Third Zone | 7.71 | 0.00000 | 7.71537 | 7.70 | 0.00000 | 7.71537 |
| Fourth Zone | 7.48 | 0.00000 | 7.50289 | 7.46 | 0.00450 | 7.48544 |
| Fifth Zone | 7.71 | 0.00000 | 7.74663 | 7.70 | 0.00338 | 7.73665 |
| Improved Amount of Spherical Aberration | | | 0.02D | | | |

As can be seen from Table 6, in the portions for far vision, the radii of curvature are substantially the same and the Z-coordinate is monotonously increased. On the other hand, in the portions for near vision, the radius of curvature is monotonously increased and the Z-coordinate is also monotonously decreased. In addition, in the portions for both of far vision and near vision, all of the X-coordinates are zero. According to the present invention, the spherical aberration was improved by 0.02D.

(7) Example 7

When the power for far vision is −3.00D (diopter), the added power for near vision is +4.00D and the zone widths of the portions for far vision and near vision are 0.5 mm, the comparative results are shown in Table 7.

TABLE 7

| | The Present Invention | | | Conventional Design | | |
|---|---|---|---|---|---|---|
| | R(mm) | X(mm) | Z(mm) | R(mm) | X(mm) | Z(mm) |
| First Zone | 8.43 | 0.00000 | 8.43147 | 8.43 | 0.00000 | 8.43147 |
| Second Zone | 7.89 | 0.00000 | 7.89570 | 7.89 | 0.00000 | 7.89570 |
| Third Zone | 8.43 | 0.00000 | 8.44577 | 8.43 | −0.00125 | 8.45124 |
| Fourth Zone | 7.89 | 0.00000 | 7.90862 | 7.89 | 0.00038 | 7.90722 |
| Fifth Zone | 8.39 | 0.00000 | 8.43660 | 8.43 | −0.01029 | 8.47344 |
| Improved Amount of Spherical Aberration | | | 0.05D | | | |

As can be seen from Table 7, in the portions for far vision, the radius of curvature is monotonously decreased and the Z-coordinate is repeatedly decreased after being increased once. On the other hand, in the portions for near vision, the radii of curvature are substantially the same and the Z-coordinate is monotonously increased. In addition, in the portions for both of far vision and near vision, all of the X-coordinates are zero. According to the present invention, the spherical aberration was improved by 0.05D.

(8) Example 8

When the power for far vision is −3.00D (diopter), the added power for near vision is +2.00D and the zone widths of the portions for far vision and near vision are 0.5 mm, the comparative results are shown in Table 8.

TABLE 8

| | The Present Invention | | | Conventional Design | | |
|---|---|---|---|---|---|---|
| | R(mm) | X(mm) | Z(mm) | R(mm) | X(mm) | Z(mm) |
| First Zone | 8.43 | 0.00000 | 8.43031 | 8.43 | 0.00000 | 8.43031 |
| Second Zone | 8.15 | 0.00000 | 8.15764 | 8.15 | 0.00000 | 8.15764 |
| Third Zone | 8.42 | 0.00000 | 8.44303 | 8.43 | −0.00125 | 8.44850 |
| Fourth Zone | 8.15 | 0.00000 | 8.16983 | 8.15 | −0.00054 | 8.17163 |
| Fifth Zone | 8.39 | 0.00000 | 8.42980 | 8.43 | −0.00975 | 8.46680 |
| Improved Amount of Spherical Aberration | | | 0.05D | | | |

As can be seen from Table 8, in the portions for far vision, the radius of curvature is monotonously decreased and the Z-coordinate is repeatedly decreased after being increased once. On the other hand, in the portions for near vision, the radii of curvature are substantially the same and the Z-coordinate is monotonously increased. In addition, in the portions for both of far vision and near vision, all of the X-coordinates are zero. According to the present invention, the spherical aberration was improved by 0.05D.

As shown in Examples 1 through 8, according to the present invention, in a case where the zone widths in the portions for both of far vision and near vision are substantially the same, the spherical aberration can be significantly improved over the whole optical zones in comparison with the conventional design. In particular, when the zone widths in the portions for far vision and near vision are wide and/or when the absolute value of the power for far vision is great, the spherical aberration can be greatly improved. While only the improved amount of spherical aberration in the fifth zone has been shown as an example, the spherical aberrations in all of the second zone or more can be improved according to the present invention although the same spherical aberrations occur in all of the second zone or more in the conventional design.

In the aforementioned preferred embodiments, while the zone widths for both of far vision and near vision have been substantially the same, the different zone widths for far vision and near vision may be used.

Referring to FIGS. 10 through 18 and using numeric values, the improvements of spherical aberration according to the present invention compared with the conventional design will be described below.

The contact lens used herein is a water-containing soft contact leans, and the radius of curvature of the base curve 3 is 8.0 mm in a moisture state. In addition, the power for far vision is +3.00D (diopter) and the added power for near vision is +2.00D. Furthermore, the first zone for far vision, the first zone for near vision, the second zone for far vision, the second zone for near vision, . . . outside from the center of the contact lens 1, are defined by the terms "first zone", "second zone", "third zone", "fourth zone", . . . , respectively. In addition, the respective curved surfaces are defined by F1, N1, F2, N2, . . . and the respective centers of curvature are defined by $O_{F1}$, $O_{N2}$, $O_{F2}$, $O_{N2}$. . . . Furthermore, the improved amount of spherical aberration according to the present invention compared with the conventional design is shown by the difference in spherical aberration in the fifth zone (F3).

Then, referring to FIGS. 10 through 18, the ninth through seventeenth preferred embodiments are shown in Tables 9 through 17.

Figure 10:
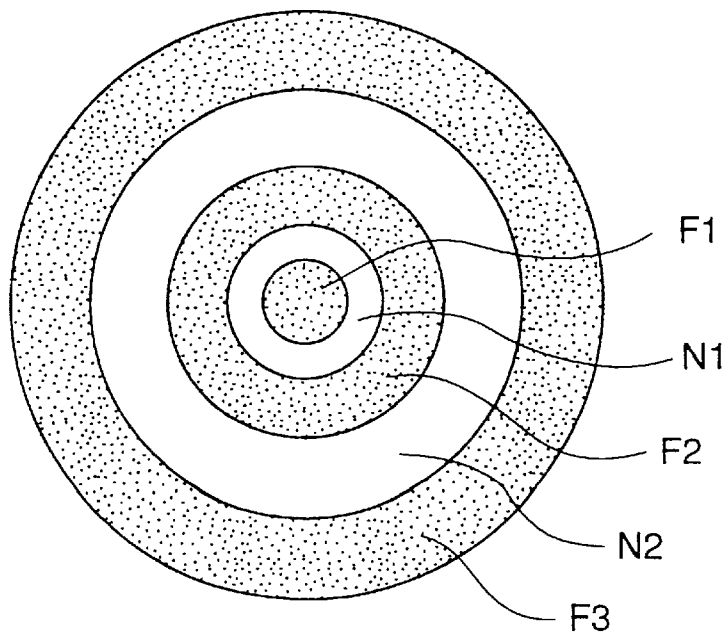
FIG. 10 is a plan view of the ninth preferred embodiment of a contact lens according to the present invention.

(9) Example 9 (see FIG. 10)

First Zone Width for Far Vision: 0.50 mm

First Zone Width for Near Vision: 0.50 mm

Second Zone Width for Far Vision: 0.75 mm

Second Zone Width for Near Vision: 1.00 mm

Third Zone Width for Far Vision: 1.00 mm

Area Ratio in Optical Zone (Portion for Far Vision: Portion for Near Vision) 62:38

TABLE 9

|  | The Present Invention | | | Conventional Design | | |
| --- | --- | --- | --- | --- | --- | --- |
|  | R(mm) | X(mm) | Z(mm) | R(mm) | X(mm) | Z(mm) |
| First Zone | 7.70 | 0.00000 | 7.69691 | 7.70 | 0.00000 | 7.69691 |
| Second Zone | 7.46 | 0.00000 | 7.47028 | 7.46 | 0.00000 | 7.47028 |

TABLE 9-continued

|  | The Present Invention | | | Conventional Design | | |
| --- | --- | --- | --- | --- | --- | --- |
|  | R(mm) | X(mm) | Z(mm) | R(mm) | X(mm) | Z(mm) |
| Third Zone | 7.71 | 0.00000 | 7.71537 | 7.70 | 0.00000 | 7.71537 |
| Fourth Zone | 7.50 | 0.00000 | 7.52384 | 7.46 | 0.01238 | 7.48560 |
| Fifth Zone | 7.75 | 0.00000 | 7.79298 | 7.70 | 0.02063 | 7.74874 |
| Improved Amount of Spherical Aberration |  | 0.14D |  |  |  |  |

As can be seen from Table 9, in the portions for far vision, the radius of curvature is monotonously increased and the Z-coordinate is also monotonously increased. On the other hand, in the portions for near vision, the radius of curvature is monotonously increased and the Z-coordinate is also monotonously increased. In addition, in the portions for both of far vision and near vision, all of the X-coordinates are zero. According to the present invention, the spherical aberration was improved by 0.14D.

Figure 11:
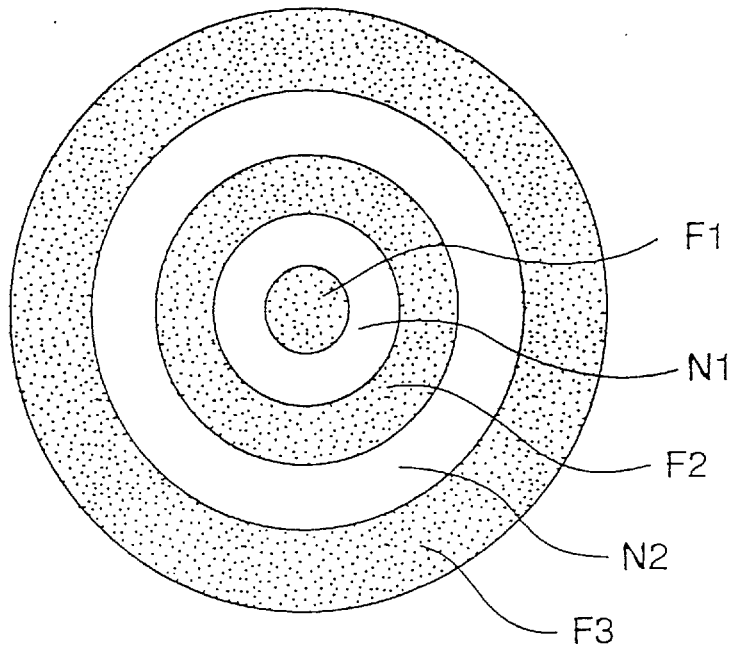
FIG. 11 is a plan view of the tenth preferred embodiment of a contact lens according to the present invention.

(10) Example 10 (see FIG. 11)

First Zone Width for Far Vision: 0.50 mm

First Zone Width for Near Vision: 0.75 mm

Second Zone Width for Far Vision: 0.75 mm

Second Zone Width for Near Vision: 0.75 mm

Third Zone Width for Far Vision: 1.00 mm

Area Ratio in Optical Zone (Portion for Far Vision: Portion for Near Vision) 65:35

TABLE 10

|  | The Present Invention | | | Conventional Design | | |
| --- | --- | --- | --- | --- | --- | --- |
|  | R(mm) | X(mm) | Z(mm) | R(mm) | X(mm) | Z(mm) |
| First Zone | 7.70 | 0.00000 | 7.69691 | 7.70 | 0.00000 | 7.69691 |
| Second Zone | 7.46 | 0.00000 | 7.47028 | 7.46 | 0.00000 | 7.47028 |
| Third Zone | 7.71 | 0.00000 | 7.71641 | 7.70 | 0.00000 | 7.71641 |
| Fourth Zone | 7.51 | 0.00000 | 7.52905 | 7.46 | 0.01463 | 7.48554 |
| Fifth Zone | 7.75 | 0.00000 | 7.79202 | 7.70 | 0.02063 | 7.74782 |
| Improved Amount of Spherical Aberration |  | 0.14D |  |  |  |  |

As can be seen from Table 10, in the portions for far vision, the radius of curvature is monotonously increased and the Z-coordinate is also monotonously increased. On the other hand, in the portions for near vision, the radius of curvature is monotonously increased and the Z-coordinate is also monotonously increased. In addition, in the portions for both of far vision and near vision, all of the X-coordinates are zero. According to the present invention, the spherical aberration was improved by 0.14D.

Figure 12:
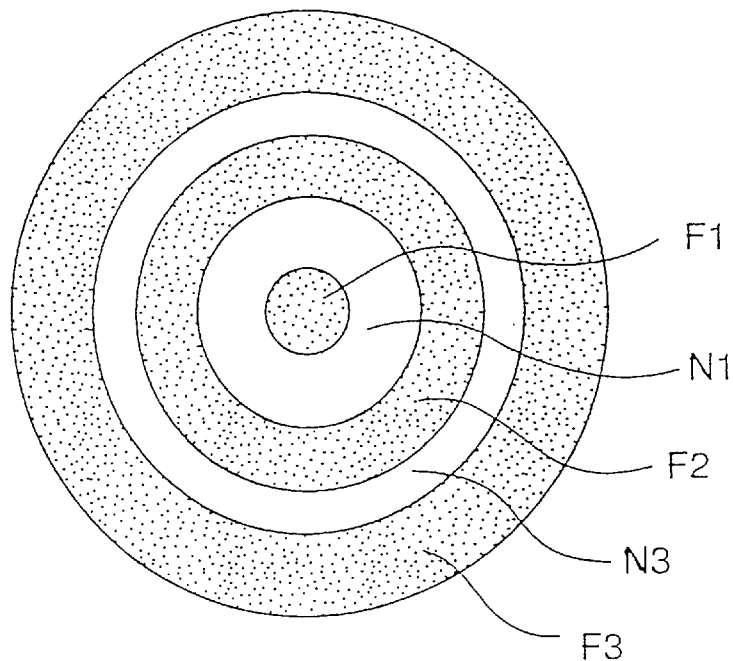
FIG. 12 is a plan view of the eleventh preferred embodiment of a contact lens according to the present invention.

(11) Example 11 (see FIG. 12)

First Zone Width for Far Vision: 0.50 mm

First Zone Width for Near Vision: 1.00 mm

Second Zone Width for Far Vision: 0.75 mm

Second Zone Width for Near Vision: 0.50 mm

Third Zone Width for Far Vision: 1.00 mm

Area Ratio in Optical Zone (Portion for Far Vision: Portion for Near Vision) 68:32

TABLE 11

|  | The Present Invention | | | Conventional Design | | |
| --- | --- | --- | --- | --- | --- | --- |
|  | R(mm) | X(mm) | Z(mm) | R(mm) | X(mm) | Z(mm) |
| First Zone | 7.70 | 0.00000 | 7.69691 | 7.70 | 0.00000 | 7.69691 |
| Second Zone | 7.46 | 0.00000 | 7.47028 | 7.46 | 0.00000 | 7.47028 |
| Third Zone | 7.70 | 0.00000 | 7.72361 | 7.70 | 0.00000 | 7.71829 |
| Fourth Zone | 7.52 | 0.00000 | 7.53576 | 7.46 | 0.01463 | 7.48618 |
| Fifth Zone | 7.75 | 0.00000 | 7.79150 | 7.70 | 0.02063 | 7.74729 |
| Improved Amount of Spherical Aberration | | | 0.14D | | | |

As can be seen from Table 11, in the portions for far vision, the radius of curvature is monotonously increased and the Z-coordinate is also monotonously increased. On the other hand, in the portions for near vision, the radius of curvature is monotonously increased and the Z-coordinate is also monotonously increased. In addition, in the portions for both of far vision and near vision, all of the X-coordinates are zero. According to the present invention, the spherical aberration was improved by 0.14D.

Figure 13:
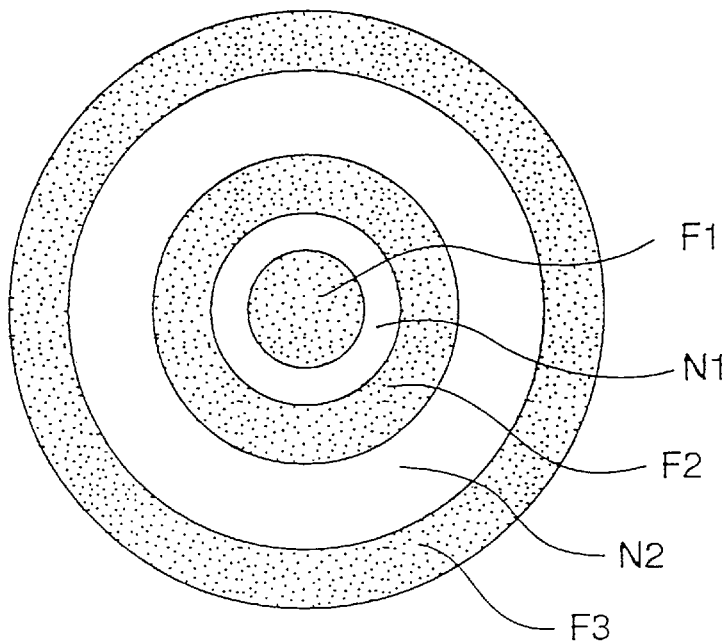
FIG. 13 is a plan view of the twelfth preferred embodiment of a contact lens according to the present invention.

(12) Example 12 (see FIG. 13)

First Zone Width for Far Vision: 0.75 mm

First Zone Width for Near Vision: 0.50 mm

Second Zone Width for Far Vision: 0.75 mm

Second Zone Width for Near Vision: 1.00 mm

Third Zone Width for Far Vision: 0.75 mm

Area Ratio in Optical Zone (Portion for Far Vision: Portion for Near Vision) 58:42

TABLE 12

|  | The Present Invention | | | Conventional Design | | |
| --- | --- | --- | --- | --- | --- | --- |
|  | R(mm) | X(mm) | Z(mm) | R(mm) | X(mm) | Z(mm) |
| First Zone | 7.70 | 0.00000 | 7.69528 | 7.70 | 0.00000 | 7.69528 |
| Second Zone | 7.46 | 0.00000 | 7.47021 | 7.46 | 0.00038 | 7.46800 |
| Third Zone | 8.70 | 0.00000 | 7.71588 | 7.70 | 0.00075 | 7.71412 |
| Fourth Zone | 7.52 | 0.00000 | 7.53677 | 7.46 | 0.01838 | 7.48438 |
| Fifth Zone | 8.75 | 0.00000 | 7.79852 | 7.70 | 0.02363 | 7.75001 |
| Improved Amount of Spherical Aberration | | | 0.13D | | | |

As can be seen from Table 12, in the portions for far vision, the radius of curvature is monotonously increased and the Z-coordinate is also monotonously increased. On the other hand, in the portions for near vision, the radius of curvature is monotonously increased and the Z-coordinate is also monotonously increased. In addition, in the portions for both of far vision and near vision, all of the X-coordinates are zero. According to the present invention, the spherical aberration was improved by 0.13D.

Figure 14:
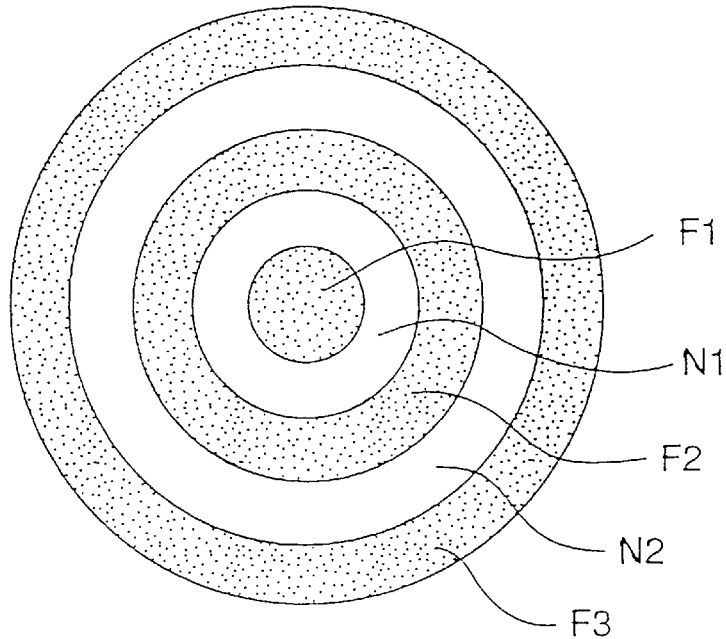
FIG. 14 is a plan view of the thirteenth preferred embodiment of a contact lens according to the present invention.

(13) Example 13 (see FIG. 14)

First Zone Width for Far Vision: 0.75 mm

First Zone Width for Near Vision: 0.75 mm

Second Zone Width for Far Vision: 0.75 mm

Second Zone Width for Near Vision: 0.75 mm

Third Zone Width for Far Vision: 0.75 mm

Area Ratio in Optical Zone (Portion for Far Vision: Portion for Near Vision) 60:40

TABLE 13

|  | The Present Invention | | | Conventional Design | | |
| --- | --- | --- | --- | --- | --- | --- |
|  | R(mm) | X(mm) | Z(mm) | R(mm) | X(mm) | Z(mm) |
| First Zone | 7.70 | 0.00000 | 7.69528 | 7.70 | 0.00000 | 7.69528 |
| Second Zone | 7.47 | 0.00000 | 7.47028 | 7.46 | 0.00075 | 7.46804 |
| Third Zone | 7.70 | 0.00000 | 7.72303 | 7.70 | 0.00188 | 7.71590 |
| Fourth Zone | 7.52 | 0.00000 | 7.54363 | 7.46 | 0.02175 | 7.48505 |
| Fifth Zone | 7.75 | 0.00000 | 7.80072 | 7.70 | 0.02475 | 7.74970 |
| Improved Amount of Spherical Aberration | | | 0.12D | | | |

As can be seen from Table 13, in the portions for far vision, the radius of curvature is monotonously increased and the Z-coordinate is also monotonously increased. On the other hand, in the portions for near vision, the radius of curvature is monotonously increased and the Z-coordinate is also monotonously increased. In addition, in the portions for both of far vision and near vision, all of the X-coordinates are zero. According to the present invention, the spherical aberration was improved by 0.12D.

Figure 15:
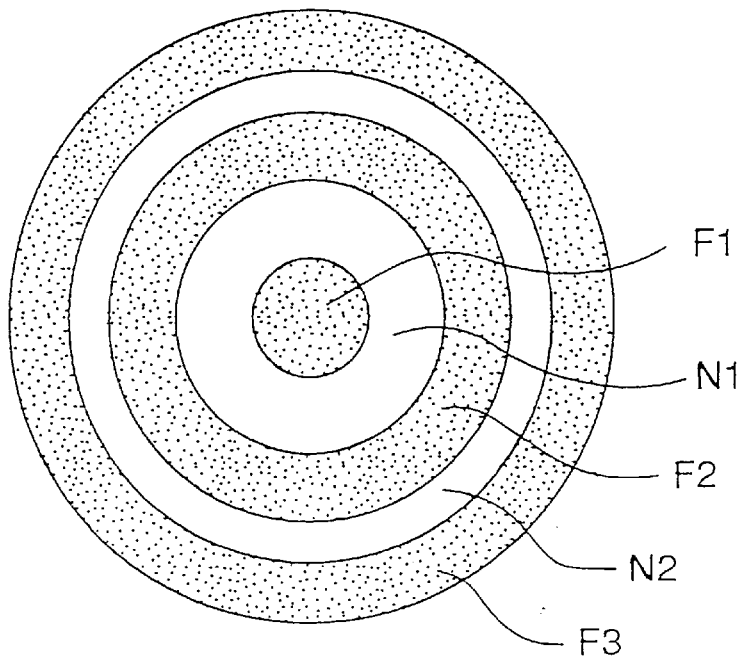
FIG. 15 is a plan view of the fourteenth preferred embodiment of a contact lens according to the present invention.

(14) Example 14 (see FIG. 15)

First Zone Width for Far Vision: 0.75 mm

First Zone Width for Near Vision: 1.00 mm

Second Zone Width for Far Vision: 0.75 mm

Second Zone Width for Near Vision: 0.50 mm

Third Zone Width for Far Vision: 0.75 mm

Area Ratio in Optical Zone (Portion for Far Vision: Portion for Near Vision) 63:37

TABLE 14

|  | The Present Invention | | | Conventional Design | | |
| --- | --- | --- | --- | --- | --- | --- |
|  | R(mm) | X(mm) | Z(mm) | R(mm) | X(mm) | Z(mm) |
| First Zone | 7.70 | 0.00000 | 7.69528 | 7.70 | 0.00000 | 7.69528 |
| Second Zone | 7.47 | 0.00000 | 7.47733 | 7.46 | 0.00188 | 7.46816 |
| Third Zone | 7.70 | 0.00000 | 7.73124 | 7.70 | 0.00375 | 7.71783 |
| Fourth Zone | 7.53 | 0.00000 | 7.55057 | 7.46 | 0.02550 | 7.48557 |
| Fifth Zone | 7.75 | 0.00000 | 7.79965 | 7.70 | 0.02475 | 7.74863 |
| Improved Amount of Spherical Aberration | | | 0.12D | | | |

As can be seen from Table 14, in the portions for far vision, the radius of curvature is monotonously increased and the Z-coordinate is also monotonously increased. On the other hand, in the portions for near vision, the radius of curvature is monotonously increased and the Z-coordinate is also monotonously increased. In addition, in the portions for both of far vision and near vision, all of the X-coordinates are zero. According to the present invention, the spherical aberration was improved by 0.12D.

Figure 16:
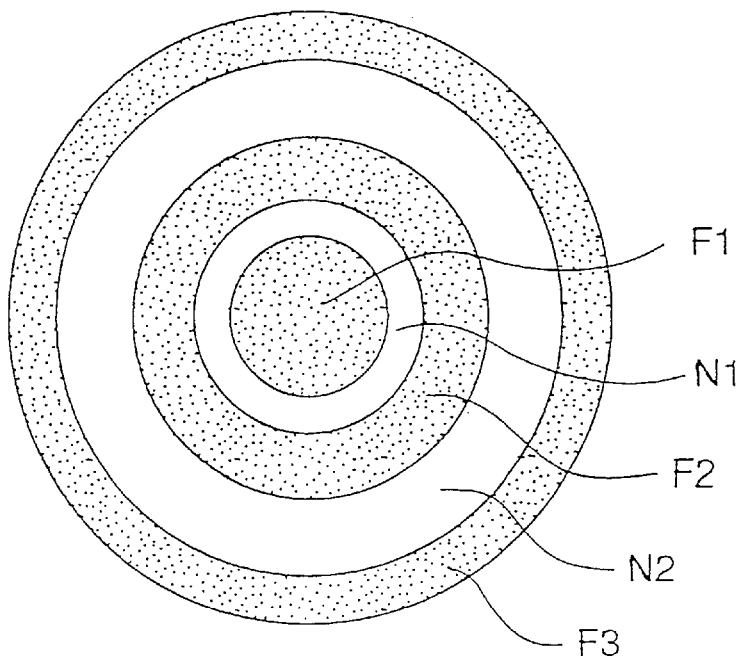
FIG. 16 is a plan view of the fifteenth preferred embodiment of a contact lens according to the present invention.

(15) Example 15 (see FIG. 16)

First Zone Width for Far Vision: 1.00 mm

First Zone Width for Near Vision: 0.50 mm

Second Zone Width for Far Vision: 0.75 mm

Second Zone Width for Near Vision: 1.00 mm

Third Zone Width for Far Vision: 0.50 mm

Area Ratio in Optical Zone (Portion for Far Vision: Portion for Near Vision) 52:48

TABLE 15

|  | The Present Invention | | | Conventional Design | | |
| --- | --- | --- | --- | --- | --- | --- |
|  | R(mm) | X(mm) | Z(mm) | R(mm) | X(mm) | Z(mm) |
| First Zone | 7.70 | 0.00000 | 7.69745 | 7.70 | 0.00000 | 7.69745 |
| Second Zone | 7.47 | 0.00000 | 7.47482 | 7.46 | 0.00000 | 7.46935 |
| Third Zone | 7.70 | 0.00000 | 7.72217 | 7.70 | 0.00150 | 7.71722 |
| Fourth Zone | 7.53 | 0.00000 | 7.55246 | 7.46 | 0.02550 | 7.48750 |
| Fifth Zone | 7.76 | 0.00000 | 7.80729 | 7.70 | 0.02625 | 8.75532 |
| Improved Amount of Spherical Aberration |  |  | 0.07D |  |  |  |

As can be seen from Table 15, in the portions for far vision, the radius of curvature is monotonously increased and the Z-coordinate is also monotonously increased. On the other hand, in the portions for near vision, the radius of curvature is monotonously increased and the Z-coordinate is also monotonously increased. In addition, in the portions for both of far vision and near vision, all of the X-coordinates are zero. According to the present invention, the spherical aberration was improved by 0.07D.

Figure 17:
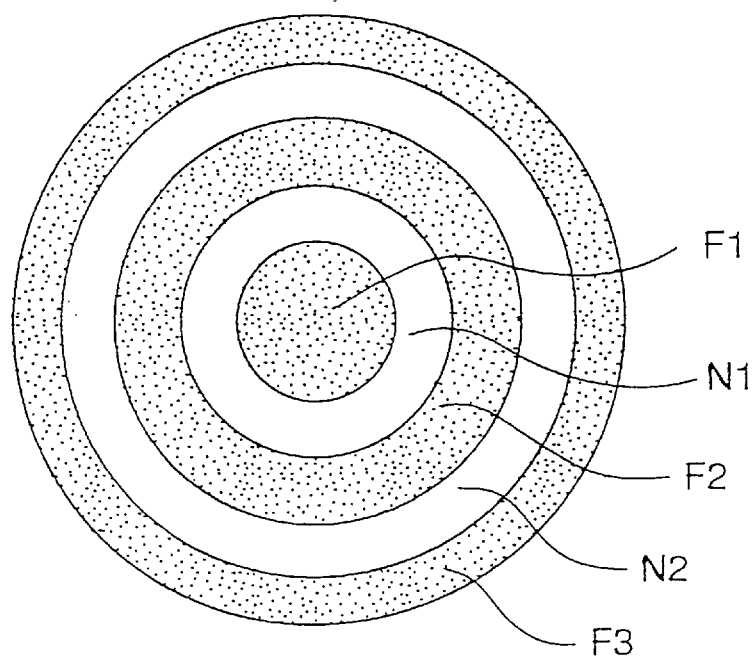
FIG. 17 is a plan view of the sixteen preferred embodiment of a contact lens according to the present invention.

(16) Example 16 (see FIG. 17)

First Zone Width for Far Vision: 1.00 mm

First Zone Width for Near Vision: 0.75 mm

Second Zone Width for Far Vision: 0.75 mm

Second Zone Width for Near Vision: 0.75 mm

Third Zone Width for Far Vision: 0.50 mm

Area Ratio in Optical Zone (Portion for Far Vision: Portion for Near Vision) 55:45

TABLE 16

|  | The Present Invention | | | Conventional Design | | |
| --- | --- | --- | --- | --- | --- | --- |
|  | R(mm) | X(mm) | Z(mm) | R(mm) | X(mm) | Z(mm) |
| First Zone | 7.70 | 0.00000 | 7.69745 | 7.70 | 0.00000 | 7.69745 |
| Second Zone | 7.47 | 0.00000 | 7.48045 | 7.46 | 0.00225 | 7.46950 |
| Third Zone | 7.71 | 0.00000 | 7.73038 | 7.70 | 0.00338 | 7.71915 |
| Fourth Zone | 7.54 | 0.00000 | 7.55981 | 7.46 | 0.02963 | 7.48833 |
| Fifth Zone | 7.76 | 0.00000 | 7.80618 | 7.70 | 0.02625 | 7.75421 |
| Improved Amount of Spherical Aberration |  |  | 0.07D |  |  |  |

As can be seen from Table 16, in the portions for far vision, the radius of curvature is monotonously increased and the Z-coordinate is also monotonously increased. On the other hand, in the portions for near vision, the radius of curvature is monotonously increased and the Z-coordinate is also monotonously increased. In addition, in the portions for both of far vision and near vision, all of the X-coordinates are zero. According to the present invention, the spherical aberration was improved by 0.07D.

Figure 18:
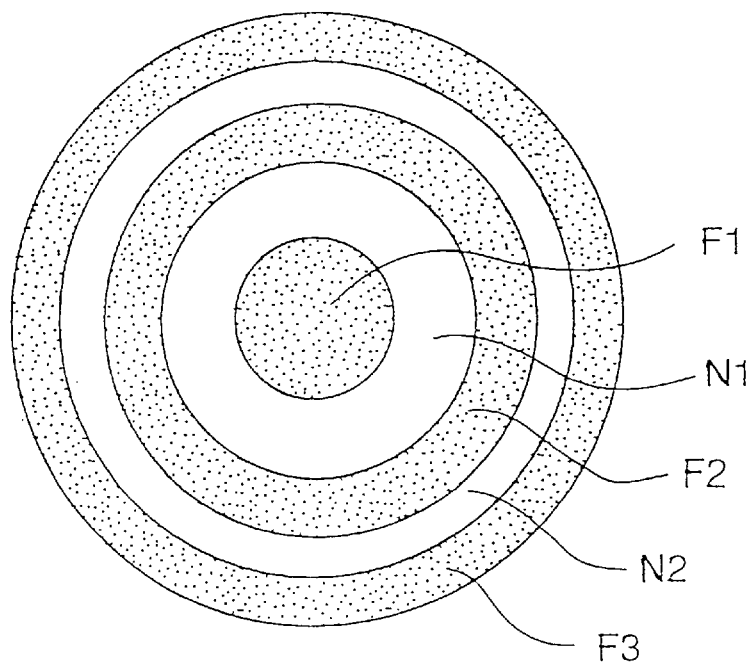
FIG. 18 is a plane view of the seventeenth preferred embodiment of a contact lens according to the present invention.

(17) Example 17 (see FIG. 18)

First Zone Width for Far Vision: 1.00 mm

First Zone Width for Near Vision: 1.00 mm

Second Zone Width for Far Vision: 0.75 mm

Second Zone Width for Near Vision: 0.50 mm

Third Zone Width for Far Vision: 0.50 mm

Area Ratio in Optical Zone (Portion for Far Vision: Portion for Near Vision) 62:38

TABLE 17

|  | The Present Invention | | | Conventional Design | | |
| --- | --- | --- | --- | --- | --- | --- |
|  | R(mm) | X(mm) | Z(mm) | R(mm) | X(mm) | Z(mm) |
| First Zone | 7.70 | 0.00000 | 7.69745 | 7.70 | 0.00000 | 7.69745 |
| Second Zone | 7.48 | 0.00000 | 7.48382 | 7.46 | 0.00300 | 7.46961 |
| Third Zone | 7.72 | 0.00000 | 7.73984 | 7.70 | 0.00600 | 7.72196 |
| Fourth Zone | 7.55 | 0.00000 | 7.56801 | 7.46 | 0.03413 | 7.48974 |
| Fifth Zone | 7.76 | 0.00000 | 7.80545 | 7.70 | 0.02625 | 7.75349 |
| Improved Amount of Spherical Aberration |  |  | 0.07D |  |  |  |

As can be seen from Table 17, in the portions for far vision, the radius of curvature is monotonously increased and the Z-coordinate is also monotonously increased. On the other hand, in the portions for near vision, the radius of curvature is monotonously increased and the Z-coordinate is also monotonously increased. In addition, in the portions for both of far vision and near vision, all of the X-coordinates are zero. According to the present invention, the spherical aberration was improved by 0.07D.

Referring to FIGS. 10 through 18, as shown in Examples 9 through 17, according to the present invention, the spherical aberration can be significantly improved over the whole optical zones in comparison with the conventional design even if the zone widths of the portions for far vision and near vision are different from each other.

Moreover, since the area ratio of the portions for far vision and near vision in the optical zones can be freely changed, the user is easy to see a nearer region for reading or desk work if the user wears a contact lens having a great energy ratio of portions for near vision.

In the aforementioned preferred embodiments, while the portions for both of far vision and near vision have been plus lenses, the portions for far vision may be minus lenses and the portions for near visions may be plus lenses. In this case, the variations of the radii of curvature and the centers of curvature are the same as those of Examples 1 through 8.

Figure 19:
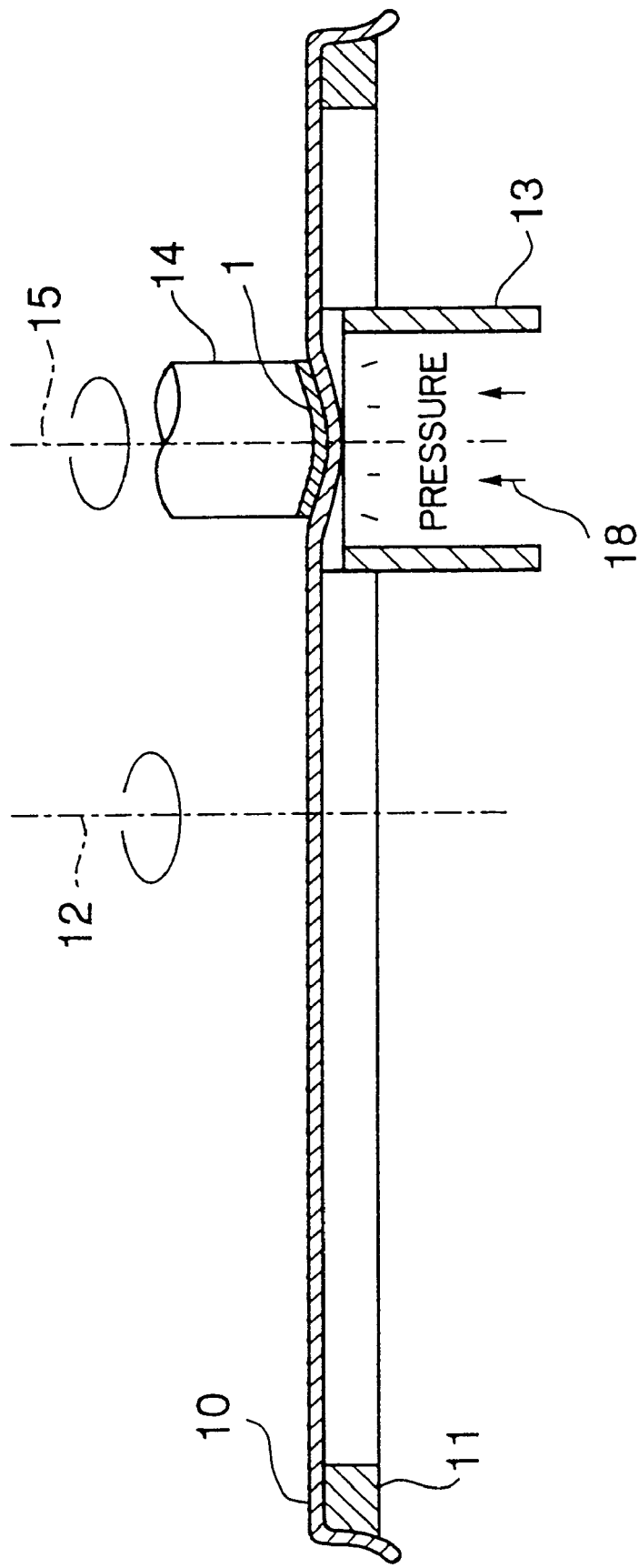
FIG. 19 is a sectional view showing the preferred embodiment of a method for producing a contact lens according to the present invention.
Figure 20:
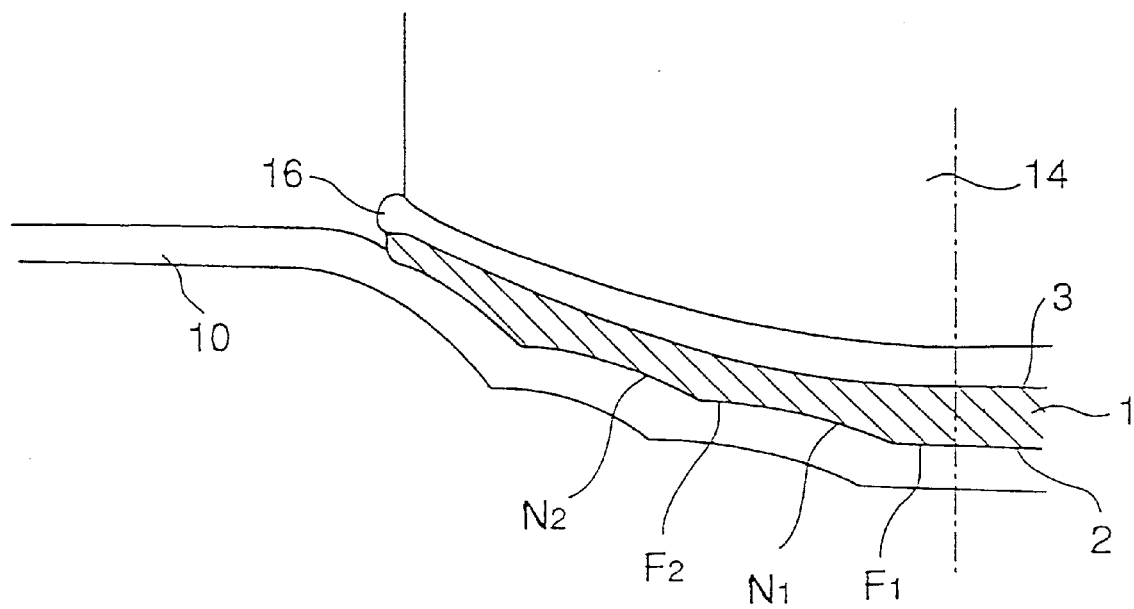
FIG. 20 is an enlarged sectional view of a part of FIG. 19.

Referring to FIGS. 19 and 20, the preferred embodiment of a method for producing a contact lens, according to the present invention, will be described.

Japanese Patent Laid-Open No. 2-83153 discloses a method for producing a contact lens using an abrasive cloth of a soft material. In this preferred embodiment, the method disclosed in Japanese Patent Laid-Open No. 83153 is applied to a contact lens 1 having a front curve 2 formed by alternately arranging a plurality of curved surfaces for far vision and a plurality of curved surfaces for near vision in the form of concentric zones.

In FIG. 19, an abrasive cloth 10 of a soft material is mounted on a rotating table 11. The rotating table 11 rotates about an abrasive-cloth rotation axis 12 so that the abrasive cloth 10 rotates with the rotating table 11. A nozzle 13 is arranged below the rotating table 11. The upper portion of the nozzle 13 is covered with the abrasive cloth 10. A fixture 14 is arranged above the nozzle 13. The fixture 14 rotates about a fixture rotation axis 15. As enlarged and shown in FIG. 20, the contact lens 1 is supported on the bottom of the fixture 14 via an adhesive 16 adhered to the base curve 3 during the processing of the contact lens 1.

In addition, compressed air 18 flows through the nozzle 13 upwards. A part of the abrasive cloth 10 covering the nozzle 13 is blown upwards by the fluid pressure of the compressed air passing through the nozzle 13, so that the abrasive cloth 10 is brought into tightly contact with the front curve 2 of the contact lens 1. As an abrasive, a powder of Al2O3 dispersed in water or oil is supplied between the front curve 2 and the abrasive cloth 10. The abrasive cloth 10 comprises, e.g., a commercially available abrasive cloth lined with polyurethane.

Furthermore, the inner diameter of the nozzle 13 is greater than the outer diameter of the front curve 2 so as to prevent the fluid pressure in the periphery of the front curve 2 from decreasing, so that the pressing force can be uniformly applied to the whole front curve 2.

When the abrasive cloth 10 and the fixture 14 rotate about the abrasive-cloth rotation axis 12 and the fixture rotation axis 15, respectively, the front curve 2 is polished by the relative movement between the front curve 2 and the abrasive cloth 10.

Other steps of the method for producing the contact lens 1 are the same as those of conventional methods.

In this preferred embodiment, the abrasive cloth 10 of a soft material is brought into tightly contact with the front curve 2 of the contact lens 1 by the compressed air 18, so that the front curve 2 is polished by the relative movement between the front curve 2 and the abrasive cloth 10. Therefore, the abrasive cloth 10 can be flexibly fitted to the shape of the curved surface of the front curve 2, so that it is possible to uniformly polish the adjacent curved surfaces F1, F2, . . . for far vision and N1, N2, . . . for near vision.

Figure 21:
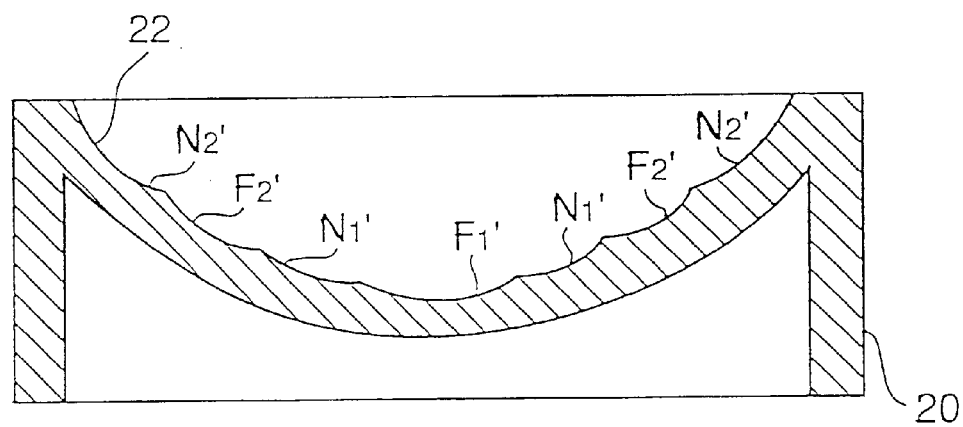
FIG. 21 is a sectional view of a contact lens mold according to the present invention.
Figure 22:
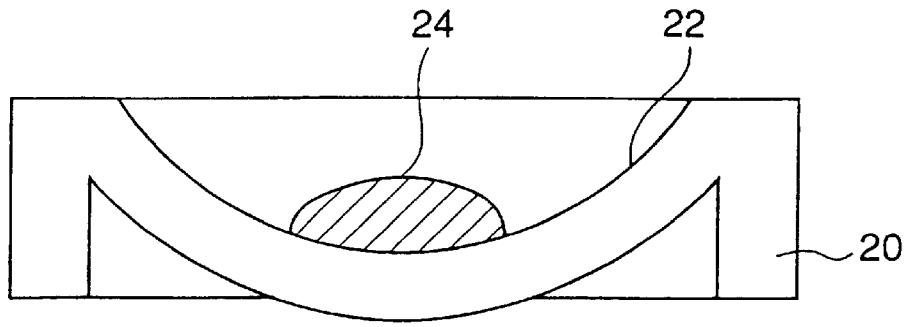
FIG. 22 is a view explaining a method for producing a contact lens using a contact lens mold according to the present invention.

Referring to FIGS. 21 and 22, the preferred embodiment of a mold for producing a contact lens, according to the present invention, will be described below.

As shown in FIG. 21, a contact lens mold 20 has a front-curve die surface 22 having a shape corresponding to that of the front curve 2 of the contact lens 1.

The front-curve die surface 22 is formed with die curved-surfaces F1', F2', . . . for far vision and die curved-surfaces N1', N2', . . . for near vision, which have convexoconcave relationship with the curved surfaces F1, F2, . . . for far vision and the curved surfaces N1, N2, . . . for near vision of the contact lens 1, respectively. The shapes of the die curved-surfaces F1', F2', . . . for far vision and the die curved-surfaces N1', N2', . . . for near vision are derived by the ray tracing method similar to the first preferred embodiment. In fact, the shapes of the curved surfaces F1, F2, . . . for far vision and the curved surfaces N1, N2, . . . for near vision of the contact lens 1 are derived by the ray tracing method, and then, the shapes of the curved surfaces having convexoconcave relationship with the aforementioned curved surfaces are derived.

Although a number of curved surfaces F1', F2', . . . for far vision and curved surfaces N1', N2', . . . for near vision are shown in FIG. 21, the number thereof may be optionally up to about 100.

Figure 23:
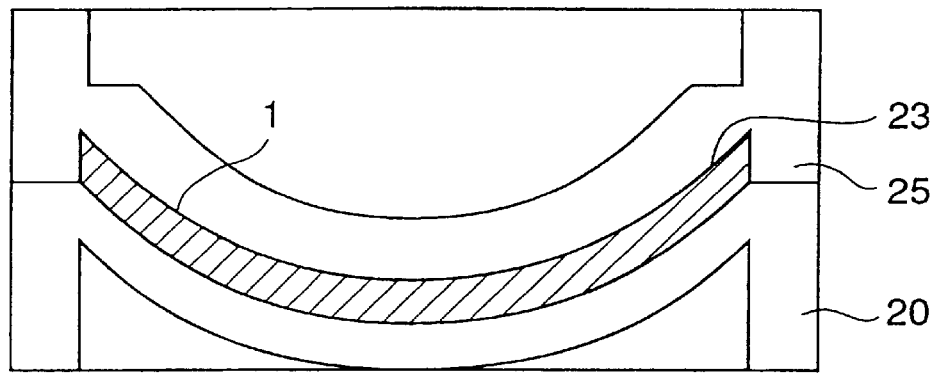
FIG. 23 is a view explaining a method for producing a contact lens using a contact lens mold according to the present invention.

Referring to FIGS. 22 and 23, a method for producing a contact lens using the contact lens mold 20 will be described below.

As shown in FIG. 22, a lens material 24 is supplied to the front-curve die surface 22 which is formed with the curved surfaces F1', F2', . . . for far vision and the curved surfaces N1', N2', . . . for near vision. Then, as shown in FIG. 23, a base-curve die 25 having a base-curve die surface 23, which has convexoconcave relationship with the base curve 3, is put so as to face the front-curve die surface 22 in place. In this state, the lens material 24 is polymerized with ultraviolet or heat. Furthermore, a contact lens of a desired shape is formed in a gap between the front-curve die surface 22 and the base-curve die surface 23.

Figure 24:
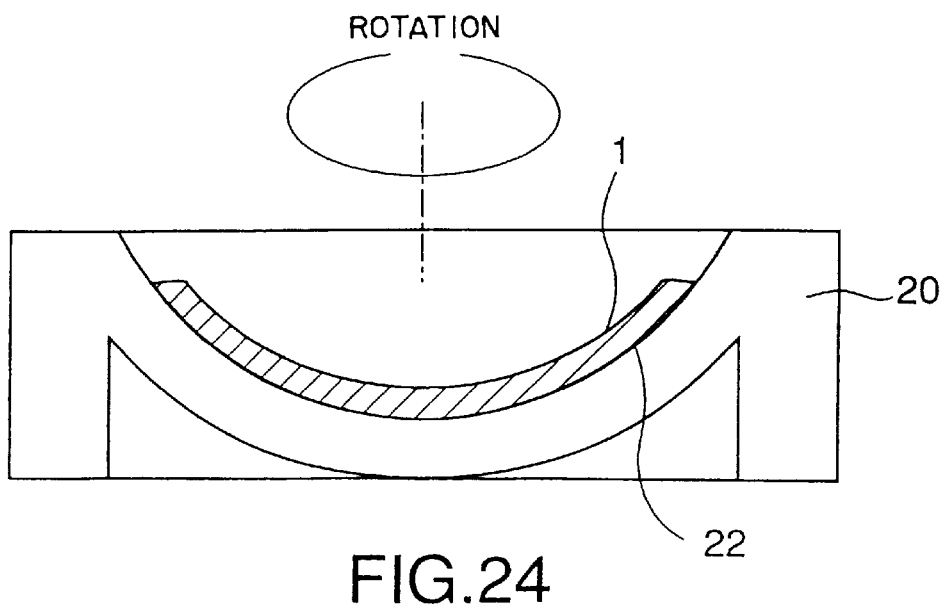
FIG. 24 is a view explaining a method for producing a contact lens using a contact lens mold according to the present invention.

Referring to FIGS. 22 and 24, another method for producing a contact lens using the contact lens mold 20 will be described below.

As shown in FIG. 22, a lens material 24 is supplied to the front-curve die surface 22 which is formed with the curved surfaces F1', F2', . . . for far vision and the curved surfaces N1', N2', . . . for near vision. Then, as shown in FIG. 24, the contact lens mold 20 is rotated. The base curve 3 is formed by controlling the revolving speed of the contact lens mold 20. Furthermore, the base curve may be formed by cutting by means of a lathe.

In this preferred embodiment, since the curved surfaces F1', F2', . . . for far vision and the curved surfaces N1', N2', . . . for near vision, which have convexoconcave relationship with the curved surfaces F1, F2, . . . for far vision and the curved surfaces N1, N2, . . . for near vision of the contact lens 1, are formed on the front-curve die surface 22 of the contact lens mold 20, it is possible to produce a contact lens wherein the spherical aberrations of portions for far vision and near vision are removed using the contact lens mold 20.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A multifocal contact lens having a lens curve formed by alternately arranging a plurality of curved surfaces for far vision and a plurality of spherically curved surfaces for near vision in the form of concentric zones, each of said plurality of curved surfaces for far vision of said lens curve having a center of curvature on an optical axis and a radius of curvature, which is set so that a ray being incident on the corresponding curved surface and being parallel to the optical axis forms an image at a location near a single focal point for far vision on the optical axis, and each of said plurality of curved surfaces for near vision of said lens curve having a center of curvature on the optical axis and a radius of curvature, which is set so that a ray being incident on the corresponding curved surface and being parallel to the optical axis forms an image at a location near a single focal point for near vision on the optical axis.

2. A multifocal contact lens having a lens curve formed by alternately arranging a plurality of curved surfaces for far vision and a plurality of spherically curved surfaces for near vision in the form of concentric zones, each of said plurality of curved surfaces for far vision of said lens curve having a center of curvature on an optical axis and a radius of curvature, which is set so that a predetermined principal ray being incident on the corresponding curved surface and being parallel to the optical axis passes through a location near a single focal point for far vision on the optical axis, and each of said plurality of curved surfaces for near vision of said lens curve having a center of curvature on the optical axis and a radius of curvature, which is set so that a predetermined principal ray being incident on the corresponding curved surface and being parallel to the optical axis passes through a location near a single focal point for near vision on the optical axis.

3. The multifocal contact lens according to claim 2, wherein a ray passing through a predetermined location in a zone width of each of the curved surfaces for far vision and near vision is selected as said predetermined principal ray with respect to all the curved surfaces for far vision and near vision, which include the curved surface for far vision containing the optical axis and the curved surface for near vision containing the optical axis.

4. The multifocal contact lens according to claim 3, wherein said predetermined location in the zone width of each of all the curved surfaces is the center in the zone width of each of all the curved surfaces.

5. The multifocal contact lens according to claim 2, wherein said predetermined principal ray is a ray, which corresponds to the optical axis with respect to a curved surface for far vision containing the optical axis and a curved surface for near vision containing the optical axis and which passes through a predetermined location in a zone width of each of other curved surfaces for far vision and near vision with respect to the other curved surfaces for far vision and near vision.

6. The multifocal contact lens according to claim 1, wherein each of said curved surfaces for far vision has a radius of curvature which is different from those of other curved surfaces for far vision, and each of said curved surfaces for near vision has a radius of curvature which is different from those of other curved surfaces for near vision.

7. The multifocal contact lens according to claim 1, wherein said lens curve is a front curve.

8. The multifocal contact lens according to claim 1, wherein said zone width of each of the curved surfaces for far vision varies in accordance with the distance between each of the curved surfaces for far vision and the optical axis, and said zone width of each of the curved surfaces for near vision varies in accordance with the distance between each of the curved surfaces for near vision and the optical axis.

9. The multifocal contact lens according to claim 1, wherein said zone width of each of the curved surfaces for far vision increases in accordance with the distance between each of the curved surfaces for far vision and the optical axis, and said zone width of each of the curved surfaces for near vision increases in accordance with the distance between each of the curved surfaces for near vision and the optical axis.

10. The multifocal contact lens according to claim 1, wherein said zone width of each of the curved surfaces for far vision decreases in accordance with the distance between each of the curved surfaces for far vision and the optical axis, and said zone width of each of the curved surfaces for near vision decreases in accordance with the distance between each of the curved surfaces for near vision and the optical axis.

11. The multifocal contact lens according to claim 1, wherein said zone width of each of the curved surfaces for far vision decreases or increases in accordance with the distance between each of the curved surfaces for far vision and the optical axis, and said zone width of each of the curved surfaces for near vision decreases or increases in accordance with the distance between each of the curved surfaces for near vision and the optical axis.

12. The multifocal contact lens according to claim 1, wherein said zone width of each of the curved surfaces for far vision is substantially the same as those of other curved surfaces for far vision, and said zone width of each of the curved surfaces for near vision is substantially the same as those of other curved surfaces for near vision.

13. The multifocal contact lens according to claim 1, wherein an energy ratio of the curved surface for far vision to the curved surface for near vision is set in accordance with indoor or outdoor use.

14. The multifocal contact lens according to claim 13, wherein said energy ratio is an area ratio of the curved surface for far vision to the curved surface for near vision.

15. The multifocal contact lens according to claim 13, wherein said energy ratio is a ratio of amount of transmitted light.

16. A mold for forming a multifocal contact lens having a lens curve formed by alternately arranging a plurality of spherically curved surfaces for far vision and a plurality of curved surfaces for near vision in the form of concentric zones,
   each of said plurality of curved surfaces for far vision of the lens curve having a center of curvature on an optical axis and a radius of curvature, which is set so that a ray being incident on the corresponding curved surface and being parallel to the optical axis forms an image at a location near a single focal point for far vision on the optical axis, and
   each of said plurality of curved surfaces for near vision of the lens curve having a center of curvature on the optical axis and a radius of curvature, which is set so that a ray being incident on the corresponding curved surface and being parallel to the optical axis forms an image at a location near a single focal point for near vision on the optical axis.

17. A mold for forming a multifocal contact lens having a lens curve formed by alternately arranging a plurality of spherically curved surfaces for far vision and a plurality of curved surfaces for near vision in the form of concentric zones,
   each of said plurality of curved surfaces for far vision of the lens curve having a center of curvature on an optical axis and a radius of curvature, which is set so that a predetermined principal ray being incident on the corresponding curved surface and being parallel to the optical axis passes through a location near a single focal point for far vision on the optical axis, and
   each of said plurality of curved surfaces for near vision of the lens curve having a center of curvature on the optical axis and a radius of curvature, which is set so that a predetermined principal ray being incident on the corresponding curved surface and being parallel to the optical axis passes through a location near a single focal point for near vision on the optical axis.

18. A method for producing a multifocal contact lens having a lens curve formed by alternately arranging a plurality of curved surfaces for far vision and a plurality of curved surfaces for near vision in the form of concentric zones, said method comprising the steps of:
   determining a focal point for far vision and a focal point for near vision on an optical axis;
   sequentially setting a proposal for a center of curvature and a proposal for a radius of curvature, which define each of the curved surfaces for far vision and near vision, with respect to each of the curved surfaces for far vision and near vision in the order of from the curved surface for far vision or near vision nearest the optical axis toward the curved surface for near vision or far vision apart from the optical axis;
   sequentially changing said proposal for the center of curvature and said proposal for the radius of curvature to carry out the ray tracing so that a predetermined principal ray being parallel to the optical axis passes through said focal point for far vision or said focal point for near vision; and
   deciding said center of curvature of each of said curved surfaces on the optical axis, and said radius of curvature of each of said curved surfaces.

19. The method for producing a multifocal contact lens according to claim 18, which further comprises the steps of:

defining a focal point for far vision and a focal point for near vision on an optical axis;

setting a proposal for a center of curvature of a first portion for far vision and a proposal for a radius of curvature of the first portion for far vision, said center of curvature and said radius of curvature of the first portion for far vision defining a first curved surface for far vision containing the optical axis;

deriving an intersection point of a circle, which is described about said proposal for the center of curvature of the first portion for far vision so as to have a radius being the same as said proposal for the radius of curvature of the first portion for far vision, with a straight line of the first portion for far vision, which is parallel to the optical axis defining a zone width of said first curved surface for far vision;

sequentially changing said proposal for the center of curvature of the first portion for far vision and said proposal for the radius of curvature of the first portion for far vision to carry out the ray tracing so that a predetermined principal ray, which is incident on said proposal for the first curved surface for far vision and which is parallel to the optical axis, passes through said focal point for far vision, to decide said center of curvature of the first portion for far vision and said radius of curvature of the first portion for far vision;

deriving an intersection point of a circle, which is described about the decided center of curvature of the first portion for far vision so as to have said radius of curvature of the first portion for far vision, with the straight line of the first portion for far vision as an intersection point of the first portion for far vision, and deciding a curved surface extending from a vertex of the lens curve to the intersection point of the first portion for far vision as the first curved surface for far vision;

setting a proposal for a radius of curvature of a first portion for near vision defining a first curved surface for near vision outwards adjacent to said first curved surface for far vision, and deriving an intersection point of a circle, which is described about the intersection point of the first portion for far vision so as to have a radius being the same as said proposal for the radius of curvature of the first portion for far vision, with the optical axis as a proposal for a center of curvature of the first portion for near vision;

deriving an intersection point of a circle, which is described about said proposal for the center of curvature of the first portion for near vision so as to have a radius being the same as said proposal for the radius of curvature of the first portion for near vision, with a straight line of the first portion for near vision, which defines a zone width of said first curved surface for near vision and which is parallel to the optical axis, to derive a proposal for the first curved surface for near vision;

sequentially changing said proposal for the center of curvature of the first portion for near vision and said proposal for the radius of curvature of the first portion for near vision, to carry out the ray tracing so that a predetermined principal ray, which is incident on said proposal for the curved surface of the first portion for near vision and which is parallel to the optical axis, to decide said center of curvature of the first portion for near vision and said radius of curvature of the first portion for near vision;

deriving an intersection point of a circle, which is described about the decided center of curvature of the first portion for near vision so as to have a radius being the same as said radius of curvature of the first portion for near vision, with the straight line of the first portion for near vision as an intersection point of the first portion for near vision, and deciding a curved surface extending from the intersection point of the first portion for far vision to the intersection point of the first portion for near vision as the first curved surface for near vision;

setting a proposal for a radius of curvature of a second portion for far vision defining a curved surface of a second portion for far vision outsides adjacent to the first curved surface for near vision, and deriving an intersection point of a circle, which is described about said intersection point of the first portion for near vision so as to have a radius being the same as said proposal for the radius of curvature of the second portion for far vision, with the optical axis as a proposal for a center of curvature of the second portion for far vision;

deriving an intersection point of a circle, which is described about said proposal for the center of curvature of the second portion for far vision so as to have a radius being the same as said proposal for the radius of curvature of the second portion for far vision, with a straight line of the second portion for far vision, which defines a zone width of said second curved surface for far vision and which is parallel to the optical axis;

sequentially changing said proposal for the center of curvature of the second portion for far vision and said proposal for the radius of curvature of the second portion for far vision, to carry out the ray tracing so that a predetermined principal ray, which is incident on said proposal for the second curved surface for far vision and which is parallel to the optical axis, passes through said focal point for far vision, to decide said center of curvature of the second portion for far vision and said radius of curvature of the second portion for far vision;

deriving an intersection point of a circle, which is described about the decided center of curvature of the second portion for far vision so as to have a radius being the same radius of curvature of the second portion for far vision, with said straight line of the second portion for far vision as an intersection portion of the second portion for far vision, and deciding a curved surface extending from said intersection point of the first portion for near vision to said intersection point of the second portion for far vision as said second curved surface for far vision;

setting a proposal for a radius of curvature of a second portion for near vision defining a curved surface of a second portion for near vision outwards adjacent to said second curved surface for far vision, and deciding an intersection point of a circle, which is described about said intersection point of the second portion for far vision so as to have a radius being the same as said proposal for the radius of curvature of the second portion for near vision, with the optical axis as a proposal for a center of curvature of the second portion for near vision;

deriving an intersection point of a circle, which is described about said proposal for the center of curvature of the second portion for near vision so as to have a radius being the same as said proposal for the radius of curvature of the second portion for near vision, with a straight line of a second portion for near vision, which defines a zone width of said second curved surface for near vision and which is parallel to the optical axis, to derive a proposal for the second curved surface for near vision;

sequentially changing said proposal for the center of curvature of the second portion for near vision and said proposal for the radius of curvature of the second portion for near vision, to carry out the ray tracing so that a predetermined principal ray, which is incident on said proposal for the second curved surface for near vision and which is parallel to the optical axis, passes through said focal point for near vision, to decide said center of curvature of the second portion for near vision and said radius of curvature of the second portion for near vision; and deriving an intersection point of a circle, which is described about the decided center of curvature of the second portion for near vision so as to have a radius being the same as said radius of curvature of the second portion for near vision, with said straight line of the second portion for near vision as an intersection point of the second portion for near vision, and deciding a curved surface extending from said intersection point of the second portion for far vision to said intersection point of the second portion for near vision as said second curved surface for near vision.

20. The method for producing a multifocal contact lens according to claim 18, which further comprises the steps of:

defining a focal point for far vision and a focal point for near vision on an optical axis;

setting a proposal for a center of curvature of a first portion for near vision and a proposal for a radius of curvature of a first portion for near vision, said center of curvature and said radius of curvature of said first portion for near vision defining a first curved surface for near vision containing the optical axis;

deriving an intersection point of a circle, which is described about said proposal for the center of curvature of the first portion for near vision so as to have a radius being the same as said proposal for the radius of curvature of the first portion for near vision, with a straight line of the first portion for near vision, which is parallel to the optical axis defining a zone width of said first curved surface for near vision;

sequentially changing said proposal for the center of curvature of the first portion for near vision and said proposal for the radius of curvature of the first portion for near vision to carry out the ray tracing so that a predetermined principal ray, which is incident on said proposal for the first curved surface for near vision and which is parallel to the optical axis, passes through said focal point for near vision, to decide said center of curvature of the first portion for near vision and said radius of curvature of the first portion for near vision;

deriving an intersection point of a circle, which is described about the decided center of curvature of the first portion for near vision so as to have said radius of curvature of the first portion for near vision, with the straight line of the first portion for near vision as an intersection point of the first portion for near vision, and deciding a curved surface extending a vertex of the lens curve to the intersection point of the first portion for near vision as the first curved surface for near vision;

setting a proposal for a radius of curvature of a first portion for far vision defining a first curved surface for far vision outwards adjacent to said first curved surface for near vision, and deriving an intersection point of a circle, which is described about the intersection point of the first portion for near vision so as to have a radius being the same as said proposal for the radius of curvature of the first portion for near vision, with the optical axis as a proposal for a center of curvature of the first portion for far vision;

deriving an intersection point of a circle, which is described about said proposal for the center of curvature of the first portion for far vision so as to have a radius being the same as said proposal for the radius of curvature of the first portion for far vision, with a straight line of the first portion for far vision, which defines a zone width of said first curved surface for far vision and which is parallel to the optical axis, to derive a proposal for the first curved surface for far vision;

sequentially changing said proposal for the center of curvature of the first portion for far vision and said proposal for the radius of curvature of the first portion for far vision, to carry out the ray tracing so that a predetermined principal ray, which is incident on said proposal for the curved surface of the first portion for far vision and which is parallel to the optical axis, to decide said center of curvature of the first portion for far vision and said radius of curvature of the first portion for far vision;

deriving an intersection point of a circle, which is described about the decided center of curvature of the first portion for far vision so as to have a radius being the same as said radius of curvature of the first portion for far vision, with the straight line of the first portion for far vision as an intersection point of the first portion for far vision, and deciding a curved surface extending from the intersection point of the first portion for near vision to the intersection point of the first portion for far vision as the first curved surface for far vision;

setting a proposal for a radius of curvature of a second portion for near vision defining a curved surface of a second portion for near vision outsides adjacent to the first curved surface for far vision, and deriving an intersection point of a circle, which is described about said intersection point of the first portion for far vision so as to have a radius being the same as said proposal for the radius of curvature of the second portion for near vision, with the optical axis as a proposal for a center of curvature of the second portion for near vision;

deriving an intersection point of a circle, which is described about said proposal for the center of curvature of the second portion for near vision so as to have a radius being the same as said proposal for the radius of curvature of the second portion for near vision, with a straight line of the second portion for near vision, which defines a zone width of said second curved surface for near vision and which is parallel to the optical axis;

sequentially changing said proposal for the center of curvature of the second portion for near vision and said proposal for the radius of curvature of the second portion for near vision, to carry out the ray tracing so that a predetermined principal ray, which is incident on said proposal for the second curved surface for near vision and which is parallel to the optical axis, passes through said focal point for near vision, to decide said center of curvature of the second portion for near vision and said radius of curvature of the second portion for near vision;

deriving an intersection point of a circle, which is described about the decided center of curvature of the second portion for near vision so as to have a radius being the same radius of curvature of the second portion for near vision, with said straight line of the second portion for near vision as an intersection portion of the second portion for near vision, and deciding a curved surface extending from said intersection point of the first portion for far vision to said intersection point of the second portion for near vision as said second curved surface for near vision;

setting a proposal for a radius of curvature of a second portion for far vision defining a second curved surface for far vision outwards adjacent to said second curved surface for near vision, and deciding an intersection point of a circle, which is described about said intersection point of the second portion for near vision so as to have a radius being the same as said proposal for the radius of curvature of the second portion for far vision, with the optical axis as a proposal for a center of curvature of the second portion for far vision;

deriving an intersection point of a circle, which is described about said proposal for the center of curvature of the second portion for far vision so as to have a radius being the same as said proposal for the radius of curvature of the second portion for far vision, with a straight line of the second portion for far vision, which defines a zone width of said second curved surface for far vision and which is parallel to the optical axis, to derive a proposal for the second curved surface for far vision;

sequentially changing said proposal for the center of curvature of the second portion for far vision and said proposal for the radius of curvature of the second portion for far vision, to carry out the ray tracing so that a predetermined principal ray, which is incident on said proposal for the second curved surface for far vision and which is parallel to the optical axis, passes through said focal point for far vision, to decide said center of curvature of the second portion for far vision and said radius of curvature of the second portion for far vision; and deriving an intersection point of a circle, which is described about the decided center of curvature of the second portion for far vision so as to have a radius being the same as said radius of curvature of the second portion for far vision, with said straight line of the second portion for far vision as an intersection point of the second portion for far vision, and deciding a curved surface extending from said intersection point of the second portion for near vision to said intersection point of the second portion for far vision as the second curved surface for far vision.

21. The method for producing a multifocal contact lens according to claim 18, wherein said predetermined principal ray is a ray passing through a predetermined location in a zone width of each of the curved surfaces for far vision and near vision with respect to all the curved surfaces for far vision and near vision, which include the curved surface for far vision containing the optical axis and the curved surface for near vision containing the optical axis.

22. The method for producing a multifocal contact lens according to claim 21, wherein said predetermined location in the zone width of each of all the curved surfaces is the center in the zone width of each of all the curved surfaces.

23. The method for producing multifocal contact lens according to claim 18, wherein said predetermined principal ray is a ray, which corresponds to the optical axis with respect to a curved surface for far vision containing the optical axis and a curved surface for near vision containing the optical axis and which passes through a predetermined location in a zone width of each of curved surfaces with respect to other curved surfaces for far vision and near vision.

24. The method for producing multifocal contact lens according to claim 18, wherein each of said curved surfaces for far vision has a radius of curvature which is different from those of other curved surfaces for far vision, and each of said curved surfaces for near vision has a radius of curvature which is different from those of other curved surfaces for near vision.

25. The method for producing multifocal contact lens according to claim 18, wherein said lens curve is a front curve.

26. A method for producing a multifocal contact lens having a lens curve formed by altermately arranging a plurality of curved surfaces for far vision and a plurality of curved surfaces for near vision in the form of concentric zones, each of said plurality of curved surfaces for far vision of said lens curve having a center of curvature on an optical axis and a radius of curvature, which is set so that a ray being incident on the corresponding curved surface and being parallel to the optical axis forms an image at a location near a single focal point for far vision on the optical axis, and each of said plurality of curved surfaces for near vision of said lens curve having a center of curvature on the optical axis and a radius of curvature, which is set so that a ray being incident on the corresponding curved surface and being parallel to the optical axis forms an image at a location near a single focal point for near vision on the optical axis, said method comprising the steps of:
bringing an abrasive cloth of a soft material into tightly contact with a front curve of the multifocal contact lens by fluid pressure; and
causing a relative movement between the front curve and the abrasive cloth to polish the front curve.

27. A method for producing a multifocal contact lens having a lens curve formed by altermately arranging a plurality of curved surfaces for far vision and a plurality of curved surfaces for near vision in the form of concentric zones, each of said plurality of curved surfaces for far vision of said lens curve having a center of curvature on an optical axis and a radius of curvature, which is set so that a predetermined principal ray being incident on the corresponding curved surface and being parallel to the optical axis forms an image at a location near a single focal point for far vision on the optical axis, and each of said plurality of curved surfaces for near vision of said lens curve having a center of curvature on the optical axis and a radius of curvature, which is set so that a predetermined principal ray being incident on the corresponding curved surface and being parallel to the optical axis forms an image at a location near a single focal point for near vision on the optical axis, said method comprising the steps of:
bringing an abrasive cloth of a soft material into tightly contact with a front curve of the multifocal contact lens by fluid pressure; and
causing a relative movement between the front curve and the abrasive cloth to polish the front curve.

* * * * *